(12) United States Patent
Besling et al.

(10) Patent No.: US 9,772,245 B2
(45) Date of Patent: Sep. 26, 2017

(54) MEMS CAPACITIVE PRESSURE SENSOR

(71) Applicant: ams International AG, Rapperswil-Jona (CH)

(72) Inventors: Willem Frederik Adrianus Besling, Eindhoven (NL); Martijn Goossens, Veldhoven (NL); Jozef Thomas Martinus van Beek, Rosmalen (NL); Peter Gerard Steeneken, Valkenswaard (NL); Olaf Wunnicke, Eindhoven (NL)

(73) Assignee: ams International AG, Unterpremstaetten (AT)

( * ) Notice: Subject to any disclaimer, the term of this patent is extended or adjusted under 35 U.S.C. 154(b) by 261 days.

(21) Appl. No.: 13/786,818

(22) Filed: Mar. 6, 2013

(65) Prior Publication Data

US 2013/0233086 A1 Sep. 12, 2013
US 2017/0016787 A9 Jan. 19, 2017

(30) Foreign Application Priority Data

Mar. 8, 2012 (EP) ..................... 12158617

(51) Int. Cl.
*G01L 9/12* (2006.01)
*G01L 7/08* (2006.01)
(Continued)

(52) U.S. Cl.
CPC .................. *G01L 9/12* (2013.01); *G01L 1/14* (2013.01); *G01L 1/142* (2013.01); *G01L 7/08* (2013.01);
(Continued)

(58) Field of Classification Search
CPC ................................ G01L 21/22; G01L 9/12
See application file for complete search history.

(56) References Cited

U.S. PATENT DOCUMENTS

| | | | |
|---|---|---|---|
| 4,730,496 A | 3/1988 | Knecht et al. | |
| 6,085,594 A * | 7/2000 | Gutierrez | G01L 9/0008 73/704 |

(Continued)

FOREIGN PATENT DOCUMENTS

| | | |
|---|---|---|
| CN | 87104354 A | 1/1988 |
| CN | 2210389 Y | 10/1995 |

(Continued)

OTHER PUBLICATIONS

Li, Q., et al; "A novel SOI Pirani sensor with triple heat sinks"; Science Direct, Procedia Chemistry 1; pp. 160-163 (2009).

(Continued)

*Primary Examiner* — R. A. Smith
*Assistant Examiner* — Herbert K Roberts
(74) *Attorney, Agent, or Firm* — McDermott Will & Emery LLP

(57) ABSTRACT

A pressure sensor measures pressure by measuring the deflection of a MEMS membrane using a capacitive read-out method. There are two ways to implement the invention. One involves the use of an integrated Pirani sensor and the other involves the use of an integrated resonator, to function as a reference pressure sensor, for measuring an internal cavity pressure.

17 Claims, 12 Drawing Sheets

(51) Int. Cl.
- *G01L 15/00* (2006.01)
- *G01L 13/02* (2006.01)
- *G01L 9/00* (2006.01)
- *G01L 1/14* (2006.01)

(52) U.S. Cl.
CPC ............ *G01L 7/088* (2013.01); *G01L 9/0041* (2013.01); *G01L 9/0045* (2013.01); *G01L 9/0072* (2013.01); *G01L 9/125* (2013.01); *G01L 13/025* (2013.01); *G01L 13/026* (2013.01); *G01L 15/00* (2013.01)

(56) References Cited

U.S. PATENT DOCUMENTS

| | | | | |
|---|---|---|---|---|
| 6,378,378 | B1* | 4/2002 | Fisher | C23C 16/45557 73/754 |
| 6,640,643 | B2* | 11/2003 | Ishio | G01L 9/0073 73/718 |
| 2004/0182165 | A1* | 9/2004 | Miyashita | G01L 9/0042 73/718 |
| 2004/0261708 | A1* | 12/2004 | Selvamanickam | C23C 14/083 118/718 |
| 2006/0070449 | A1* | 4/2006 | Yokoyama | G01L 9/0073 73/754 |
| 2007/0089525 | A1* | 4/2007 | Momose | B60C 23/0408 73/753 |
| 2007/0275494 | A1* | 11/2007 | Mayer | B81C 1/0023 438/50 |
| 2009/0249882 | A1* | 10/2009 | Kraatz | G01L 19/148 73/708 |
| 2011/0209554 | A1 | 9/2011 | Miyashita | |
| 2012/0167659 | A1 | 7/2012 | Besling et al. | |
| 2014/0053651 | A1 | 2/2014 | Besling et al. | |

FOREIGN PATENT DOCUMENTS

| | | |
|---|---|---|
| CN | 202153165 U | 2/2012 |
| EP | 2 402 284 A1 | 1/2012 |
| EP | 2 520 918 A2 | 11/2012 |
| JP | 2006071501 A | 3/2006 |
| WO | 94/05988 A1 | 3/1994 |
| WO | 2008/149298 A1 | 12/2008 |

OTHER PUBLICATIONS

Office Action from Counterpart Application CN 201310070529.6 (Oct. 10, 2014).

Chavan, Abjijeet V., et al; "Batch-Processed Vacuum-Sealed Capacitive Pressure Sensors"; J. Micro Electro Mechanical Systems, vol. 10, No. 4; pp. 580-588 (Dec. 2001).

S. Timoshenko; "Theory of Plates and Shells", McGraw-Hill Classic Textbook Reissue; p. 392 (1959).

Extended European Search Report for Application No. EP 12158617.6 (Jul. 23, 2012).

* cited by examiner

MEMS CAPACITIVE PRESSURE SENSOR

CROSS-REFERENCE TO RELATED APPLICATIONS

This application claims the priority under 35 U.S.C. §119 of European patent application no. 12158617.6, filed on Mar. 8, 2012, the contents of which are incorporated by reference herein.

This invention relates to MEMS capacitive pressure sensors.

MEMS pressure sensors typically have a piezoresistive or a capacitive read-out and are well known in the art.

A SEM cross section of one example of capacitive MEMS pressure sensor is shown in FIG. 1. The figure shows the device after sacrificial layer etch and closure of the etch holes with a 2 µm thick PECVD SiN film as one of the last membrane manufacturing steps.

The sensor has a suspended SiN membrane. The cavity underneath the SiN membrane is hermitically closed by employing a PECVD SiN process. The final device performance is largely determined by the geometrical, physical, mechanical and structural properties of this membrane. The density and composition of this membrane determine the hermeticity, out-gassing behavior, and internal stress. The stress together with the SiN thickness determine the membrane rigidity and therefore also the sensitivity of the pressure sensor.

Critical systems in medical applications, alternative energy, smart buildings, engine control (e.g. gas and fuel inlet pressure), and automotive safety applications such as tire monitoring systems require pressure sensors that deliver accurate and predictable output over their lifetime in order to track changes in operation before those changes become critical.

In the late 1970s, the emergence of silicon as a sensing material started to influence pressure measurement in industrial and commercial applications. Silicon-based sensors use a technology that has since become known as MEMS, (Micro Electro Mechanical Systems). MEMS sensors were quickly employed in automotive and medical applications within benign environments. Compact in size, they were relatively inexpensive in high-production volumes. Despite development of other pressure sensing technologies, such as thin film, thick film, and ceramic capacitive, MEMS is still the most widely used technology and destined to be the driver in emerging sensor markets such as alternative energy, automotive and/or medical applications.

With ongoing miniaturization, MEMS pressure sensors also start to suffer in some sense from their small size and the way they are fabricated. For instance, issues arise related to insensitivity, inaccuracy and signal drift. Although state-of-the-art deposition tools and lithographic techniques are being employed it is impossible to ensure that all MEMS devices are uniformly deposited or have identical geometries. Since no two MEMS are exactly the same, there has to be some means of calibrating them to cancel out those incongruities. As it is highly impractical to measure individual device parameters in an industrial fabrication environment, e.g. deflection profiles in relation to an externally applied force, it is desirable to develop methods for internal calibration to ensure that two MEMS devices function or measure in exactly the same way.

Moreover, self-calibration is needed because micro-scale devices might be exposed to harsh environments or remain dormant for long periods. In some cases the device should wake up and recalibrate itself to account for changes resulting from temperature differences, changes in the gas or liquid surroundings, or other conditions that might affect the sensor properties.

Currently most micro-machined pressure sensors use a hermetically sealed membrane that seals a reference cavity which is at a certain gauge pressure (in some cases the gauge pressure is a vacuum). The external pressure is measured because the pressure difference between the external pressure and the gauge pressure generates a force on the membrane, which causes the membrane to deflect. This deflection is then measured by piezo-resistive, capacitive, or optical sensors.

There are several difficulties related to this conventional pressure sensor design:

The gas pressure in the reference cavity needs to be very stable in order to avoid signal drift. This requires a very high level of hermeticity without out-gassing of the membrane.

In order to have large deflection amplitudes and optimum sensitivity, the thickness of the membrane should be small (or it should have a large area). Since it is difficult to make very thin membranes hermetic, these are conflicting requirements and lead to a larger sensor size.

If the reference cavity is at a certain pressure, this pressure will be temperature dependent according to Boyle's law ($P*V=n*R*T$). The sensor thus becomes temperature dependent.

The sensitivity of the pressure sensor is determined by the amplitude of membrane deformation which is in turn defined by the thickness, diameter, and yield strength of the membrane. For a gauge with capacitive read-out, the sensitivity depends also on the separation of the plates. The total dynamic range of deflection based pressure sensors is also limited by the maximum deflection of the membrane.

Any variation in membrane thickness, diameter, and stress has a significant impact on the resulting deflection profile of the membrane which affects not only the absolute capacitance reading but also accuracy and precision of the read-out. Due to process variations during fabrication, no two microstructures have the same geometric and material properties which will induce small variations in dimension, mass, stiffness that will significantly affect performance. For instance, a 10% variation in membrane thickness can cause a 50%-100% change in a microstructure's stiffness and pressure sensitivity if the membrane contains compressive and tensile layers.

Process variations have made it difficult for companies to accurately predict the performance of MEMS and specify them without measuring them all individually. Calibration and frequent re-calibration is required to ensure accurate and reliable output.

Currently there are no methods to perform self-calibration and to correct for signal drift in an industrial setting.

According to the invention, there is provided a pressure sensor, comprising:

a first pressure sensor element comprising a capacitive MEMS pressure sensor having a deformable top electrode, and a fixed bottom electrode spaced by a first cavity portion, wherein the top electrode deforms in response to a pressure to be sensed; and a second pressure sensor element housed within a second cavity portion, wherein the second cavity portion has a rigid top cover, wherein the first and second cavity portions are connected to define a combined sealed cavity, wherein the sensor further comprises means for combining the first and second pressure sensor element outputs, such that the second pressure sensor element output provides calibration of the first pressure sensor output.

This arrangement provides a second pressure sensor linked to the cavity of a capacitive sensor. One pressure sensor is based on detection of deformation whereas the other is based on the internal pressure. This internal pressure varies much less than the external pressure, and the internal pressure change is a function of the change in volume induced by the movement of the capacitive sensor electrode. Thus, the second pressure sensor is not measuring an external pressure as such, but it nevertheless can be used to provide auto-calibration of the main capacitive sensor. In particular, the second pressure sensor element performance will depend on the level of out-gassing of the cavity, and can therefore be used to compensate for changes in the performance of the capacitive pressure sensor over time. It can also compensate for temperature changes.

The first and second cavity portions can be side by side over a SOI substrate arrangement comprising a wafer, an insulator layer over the wafer and a semiconductor layer over the insulator, and the cavity portions are connected by a channel formed in the insulator layer. In this way, both pressure sensors can be formed as part of an integrated circuit using shared processing steps.

Each cavity portion can for example connect to the channel through a respective via formed in the silicon layer. The first cavity portion can be over the semiconductor layer, and the second cavity portion can formed in the semiconductor layer. The pressure sensing element can then be formed as a part of the semiconductor layer.

In another configuration, the first and second cavity portions can be combined in the same cavity over a SOI substrate arrangement comprising a wafer, an insulator layer over the wafer and a semiconductor layer over the insulator. In this way, the form factor can be reduced while both pressure sensors can be formed as part of an integrated circuit using shared processing steps.

In another configuration the first and second cavity portions are formed over a CMOS circuit, for example a read-out circuit. In this way, the form factor can be reduced due to integration of the pressure sensor functionalities on top of the integrated circuit, while both pressure sensors can be formed as part of an integrated circuit using shared processing steps. The first and second cavity portions are then side by side over the CMOS integrated circuit. The top metal layer of the CMOS integrated circuit can be used for forming electrical connections between external pressure sensor contacts and the internal pressure sensor electrodes.

In a first example, the second pressure sensor element comprises a Pirani gauge. In a second example, the second pressure sensor element comprises a MEMS resonator, wherein the resonance frequency or the quality factor of the resonance frequency is used to determine the pressure.

The invention also provides a method of operating a pressure sensor, comprising:

measuring an external pressure using a first pressure sensor element comprising a capacitive MEMS pressure sensor having a deformable top electrode, and a fixed bottom electrode spaced by a first cavity portion, wherein the top electrode deforms in response to a pressure to be sensed;

measuring an internal cavity pressure using a second pressure sensor element housed within a second cavity portion, wherein the first and second cavity portions are connected to define a combined sealed cavity;

combining the external and internal pressure measurements, such that the second pressure sensor element output provides calibration of the first pressure sensor output.

The invention also provides methods of manufacturing a pressure sensor.

A first example comprises:

providing a SOI substrate arrangement comprising a wafer, an insulator layer over the wafer and a semiconductor layer over the insulator, forming a first pressure sensor element comprising a capacitive MEMS pressure sensor having a deformable top electrode, and a fixed bottom electrode spaced by a first cavity portion, with the first cavity portion over the semiconductor layer;

forming a second pressure sensor element housed within a second cavity portion, and forming a rigid top cover over the second cavity portion and the second cavity portion formed in the semiconductor layer; and connecting the first and second cavity portions by a channel formed in the insulator layer to define a combined sealed cavity.

A second example comprises:

providing a CMOS circuit comprising a wafer with a multilevel interconnect arrangement;

forming a first pressure sensor element comprising a capacitive MEMS pressure sensor having a deformable top electrode, and a fixed bottom electrode spaced by a first cavity portion, with the first cavity portion over the metal interconnect arrangement;

forming a second pressure sensor element housed within a second cavity portion, and forming a rigid top cover over the second cavity portion; and connecting the first and second cavity portions by a channel to define a combined sealed cavity, wherein the interconnect arrangement is used to form part of the electrical connections to the pressure sensor elements.

Examples of the invention will now be described in detail with reference to the accompanying drawings, in which.

Figure 12A:
FIGS. 12A to 12K show the consecutive steps of an exemplary process flow for manufacturing a capacitive pressure sensor including a Pirani gauge or resonator.
Figure 12B:
Figure 12C:
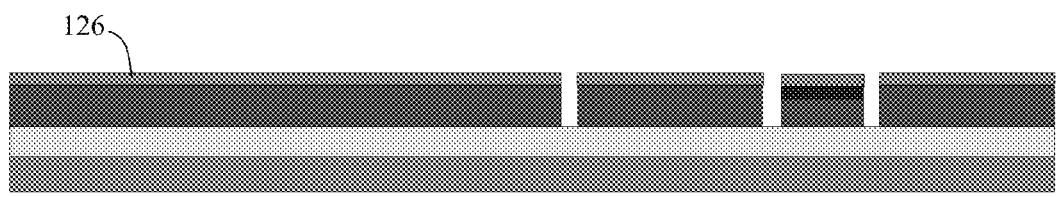
Figure 12D:
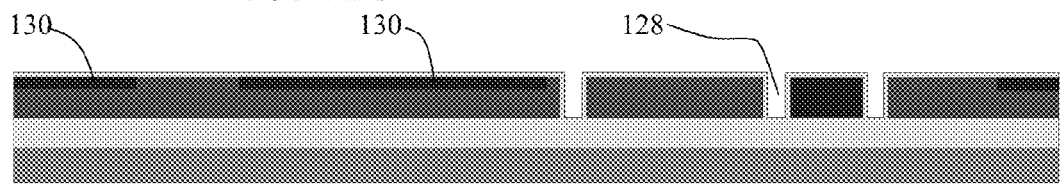
Figure 12E:
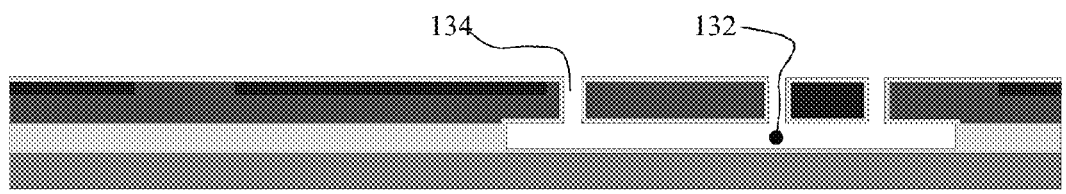
Figure 12F:
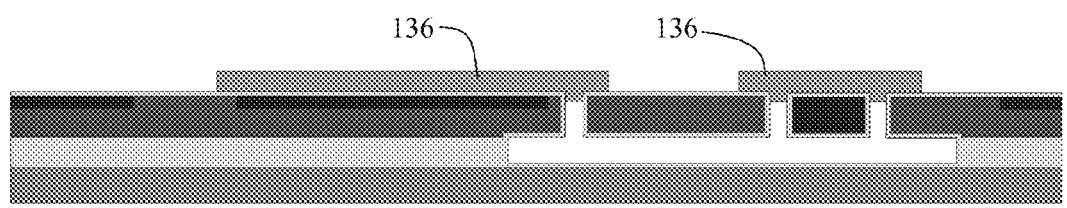
Figure 12G:
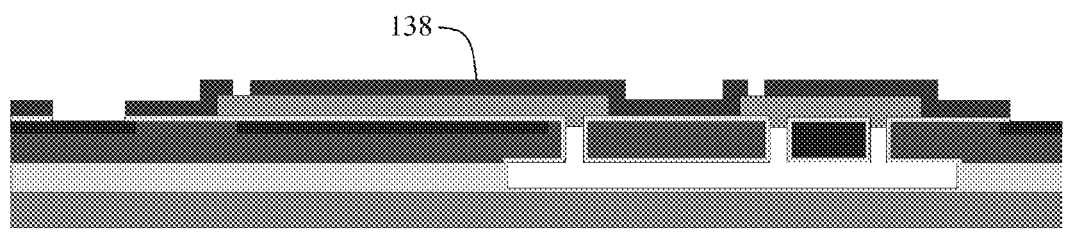
Figure 12H:
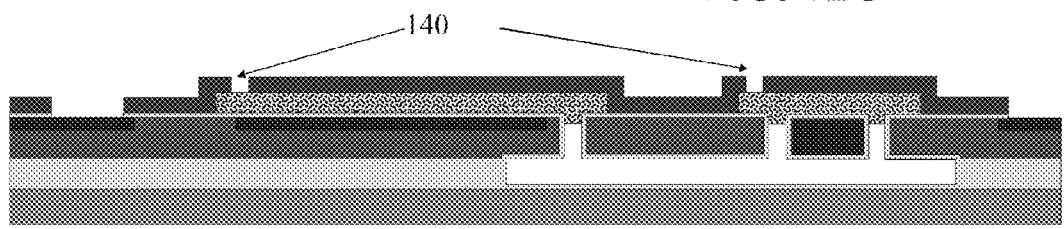
Figure 12I:
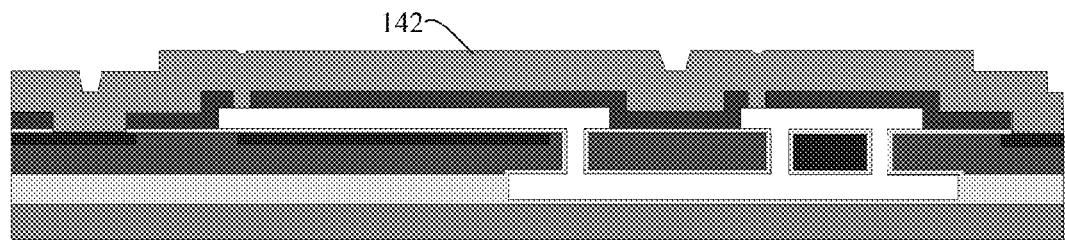
Figure 12J:
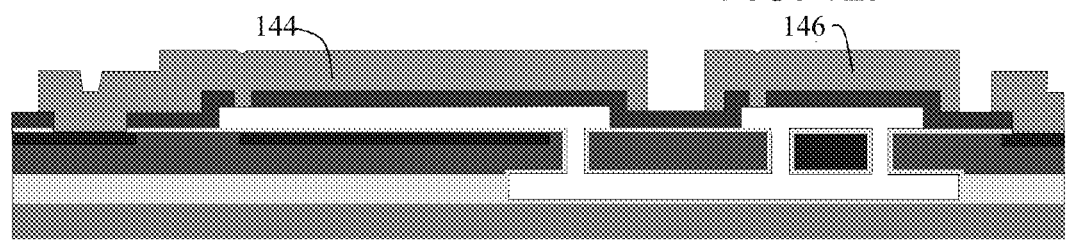
Figure 12K:
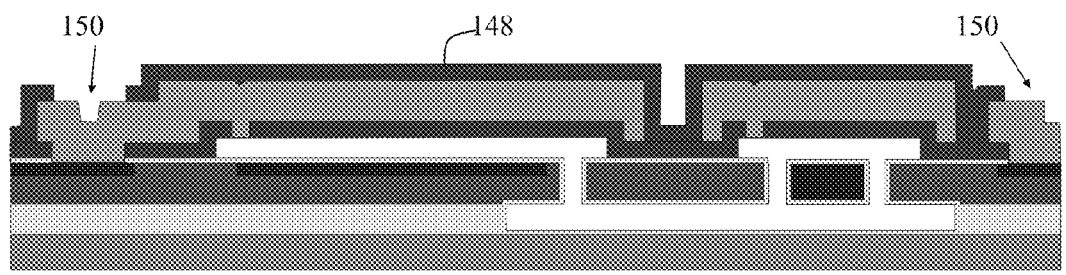
Figure 15A:
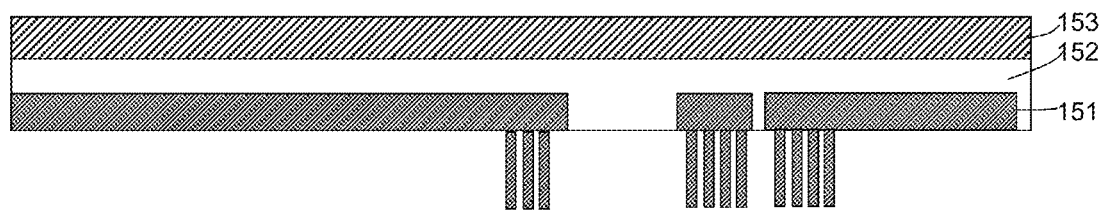
Figure 15B:
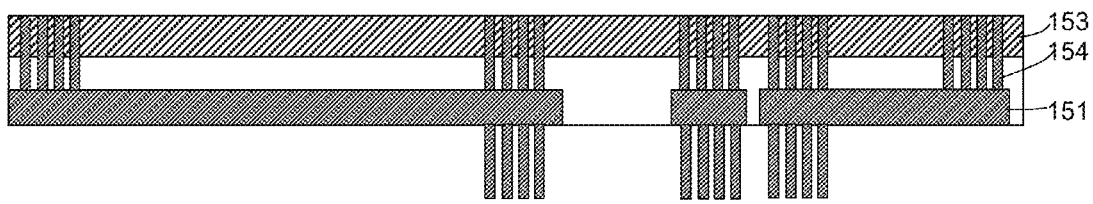
Figure 15C:
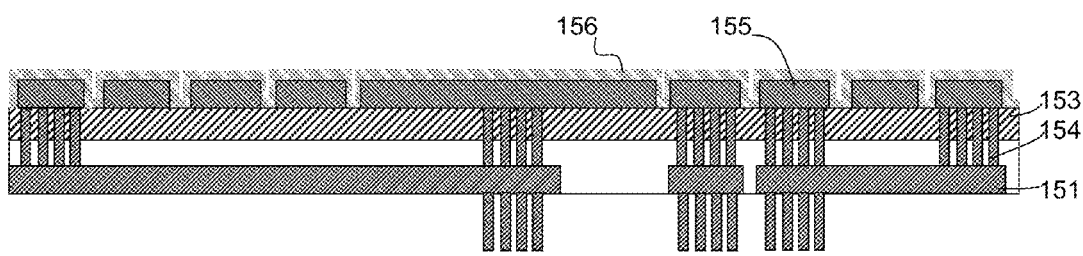
Figure 15D:
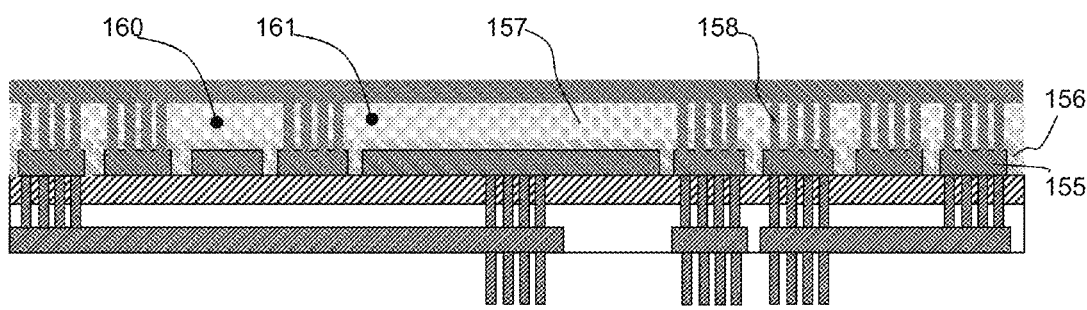
Figure 15E:
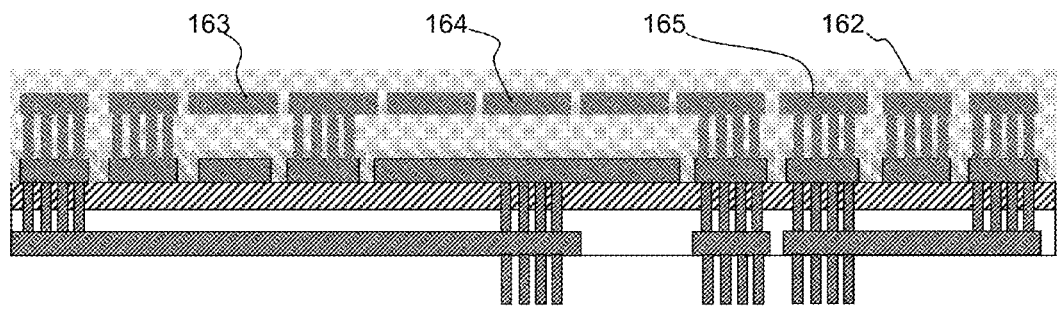
Figure 15F:
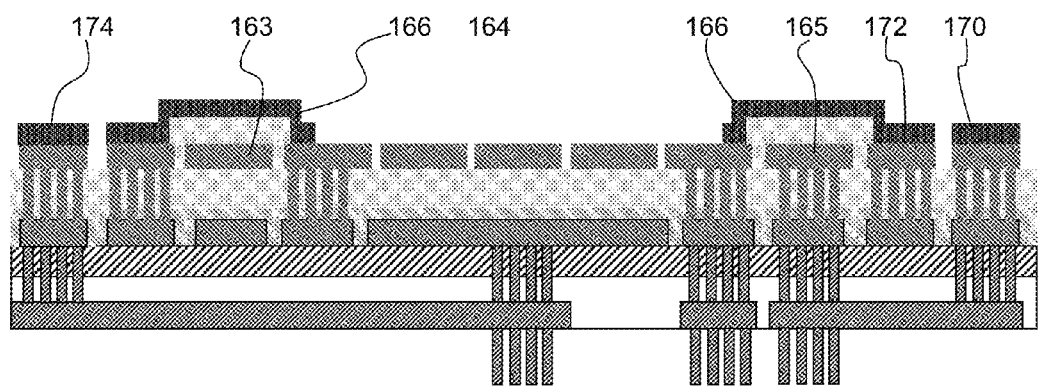
Figure 15G:
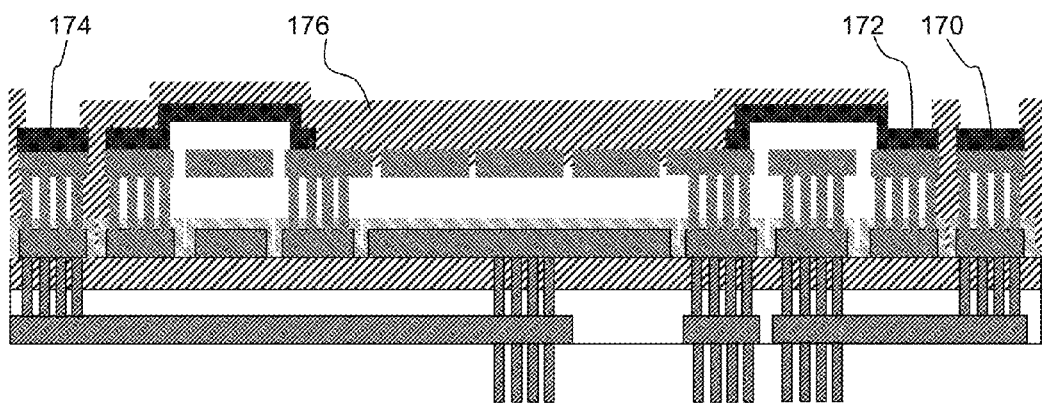
Figure 16:
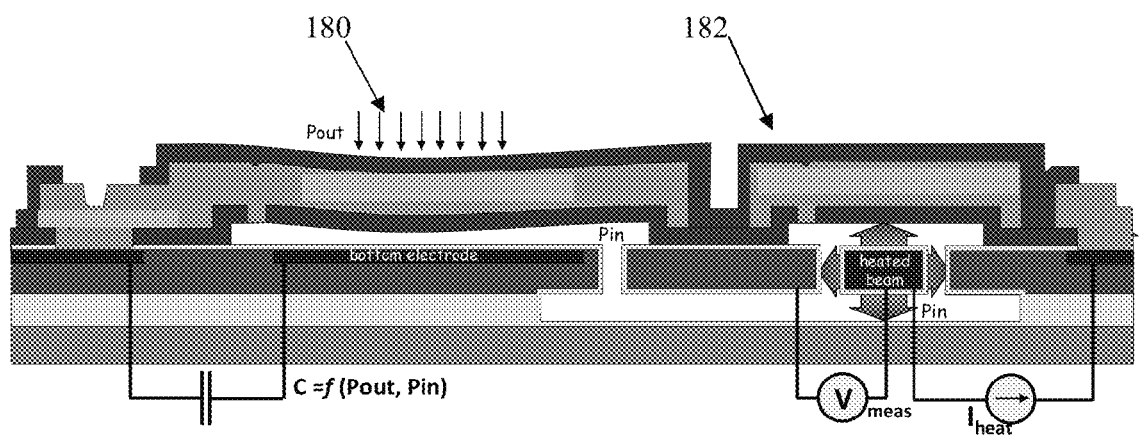

FIGS. 15A to 15G show the consecutive steps of an exemplary process flow for manufacturing a capacitive pressure sensor including a Pirani gauge on top of a CMOS circuit; and FIG. 16 shows the design of FIG. 12K with a pressure applied and for the Pirani gauge version, The invention provides a pressure sensor with a possibility to perform self calibration and correct for signal drift. The pressure difference between the external medium and the cavity is sensed by measuring the deflection of a membrane using a capacitive read-out method. There are two ways to implement the invention. One involves the use of an integrated Pirani sensor and the other involves the use of an integrated resonator, to function as a reference pressure sensor.

Pirani gauges have been widely used for vacuum measurement since their invention in 1906. A heated wire with a high temperature coefficient of resistance is placed in a vacuum environment. The wire, whose resistance is proportional to its temperature, forms one leg of a balanced Wheatstone bridge. Gas molecules collide with the wire, transferring heat away from it and unbalancing the bridge relative to a reference state. Since the frequency of molecular collisions is proportional to the gas pressure, the voltage required to maintain the bridge in balance is proportional to the pressure. Pirani gauges have become an industry standard, owing to their reliability, low cost, and relatively wide pressure range.

Micro Pirani sensors capable of monitoring vacuum levels have been the subject of intensive research efforts. Compared to traditional filament based Pirani gauges, they have the advantage of small size, low cost, fast response and a large pressure sensing range. An SOI-based process allows for long and thin structures, necessary for measuring low pressure. The sensor is for example arranged as a wire with gaps between the wire and side heat sinks.

In the first example in accordance with invention, a capacitive pressure sensor with a hermitically sealed cavity is combined with a micro Pirani gauge connected to or within the same cavity.

The internal pressure is then measured by using the resistance of a free hanging structure (i.e. a wire or Si beam with or without heat fins). The heat conduction from this structure to the surrounding gas depends on the gas pressure surrounding the structure. If there is a change of the internal pressure due to out-gassing or due to compression of the gas inside the hermetically closed cavity it can be sensed by a resistance change. The objective of using a Pirani gauge inside the cavity is to correct the membrane capacitance measurement for internal pressure changes (e.g. due to out-gassing, temperature or due to compression). Resistance variations within the Pirani gauge due to external temperature variations can be corrected using a Wheatstone bridge configuration as read-out. If the on-chip temperature is measured independently not only the resistance variations of the wire can be compensated for as well as volume expansion/pressure increase inside the cavity.

In the second example in accordance with the invention, a capacitive pressure sensor with a hermitically sealed cavity is combined with a resonator within the same cavity.

The internal pressure is then measured by using the frequency shift/quality factor of the resonating structure. If there is a change in the internal pressure due to out-gassing or due to compression of the gas inside the hermetically closed cavity it can be sensed by the peak broadening of the resonance frequency. The objective of using a resonator inside is again to correct the membrane capacitance measurement for internal pressure changes (e.g. due to out-gassing, temperature or due to compression). If a reference resonator is constructed in a separate cavity, the resonance frequency of the main resonator can be measured differentially so that ambient temperature dependence of the resonance frequency does not limit the accuracy.

In both cases, variations in process conditions due to e.g. non-uniform membrane thickness, stress and out-gassing will lead to a large spread in the deflection profiles and can thus be individually determined and calibrated using on chip processing.

Currently most micro-machined pressure sensors use a membrane that seals hermetically a reference cavity which is at a certain gauge pressure. The external pressure is measured because the pressure difference between the external pressure and the internal gauge pressure generates a force on the membrane, which causes the membrane to deflect. Ideally the internal reference pressure is a vacuum which would cancel out the impact of the internal cavity pressure. The membrane deflection is then measured in a capacitive manner using a counter electrode.

Figure 1:
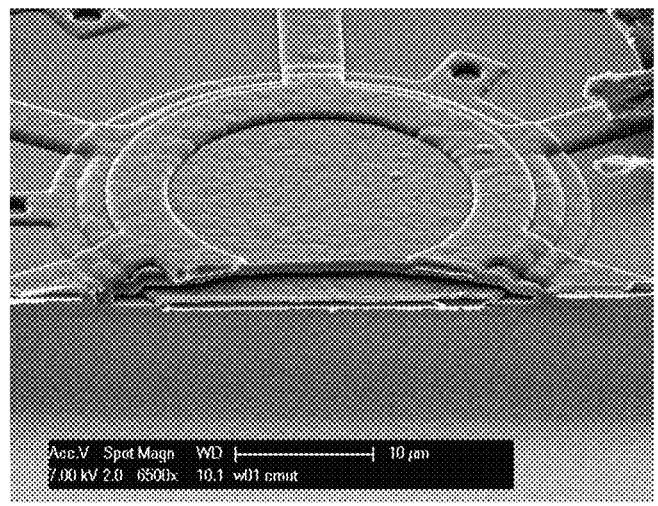
FIG. 1 shows a SEM cross section of one example of capacitive MEMS pressure sensor
Figure 2:
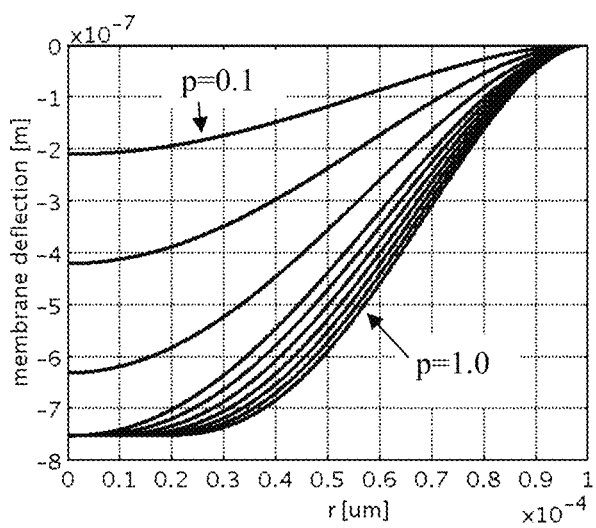
FIG. 2 shows a membrane deflection profile for a capacitance pressure sensor.

In FIG. 2 the membrane deflection profile for a capacitance pressure sensor is shown as function of pressure according to a Finite Element Model (FEM) simulation. The pressure is increased in 0.1 bar steps from 0.1 to 1 bar (10 kPa steps from 10 kPa to 100 kPa) from top to bottom. Membrane "collapse" occurs at 0.35 bar (35 kPa) for a 750 nm gap. The pressure inside the cavity is zero and no residual stress is assumed.

At a certain pressure the top membrane will start to touch the bottom of the cavity. For the SiN membrane modelled, with radius of 100 μm and 1.5 μm thickness, this occurs already at 0.35 bar (35 kPa).

Figure 3:
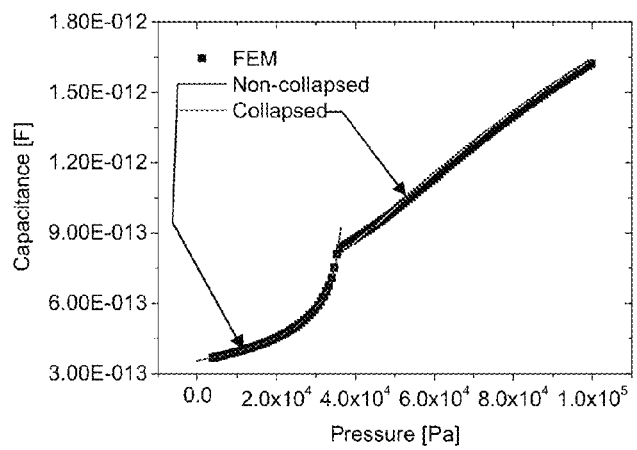
FIG. 3 shows the capacitance as function of applied pressure.

In FIG. 3 the capacitance as function of applied pressure is depicted showing the non-linear C~1/P behavior when the deflecting membrane is approaching the bottom electrode and a more or less linear C~P behavior after "touch down" of the membrane during the roll-off phase. As becomes apparent from this graph, the pressure sensitivity is largest just before "touch down" (large C-P slope). FIG. 3 again relates to a 100 μm radius SiN membrane of 1.5 μm thickness and 750 nm gap (Young's modulus 250 GPa, Poisson ratio 0.23). Between the electrodes is a 200 nm SiN dielectric layer with $\in r=6$.

The diaphragm dimensions can be designed in order to set the pressure range. Below the relation is given for the deflection of a circular membrane as function of pressure, membrane thickness, membrane radius and gap height. The deflection of a circular membrane w(r) in the flexural rigidity dominated regime as function of pressure P is given by:

$$w_D(r, P) = \frac{3P\pi R^4(1-v^2)}{16\pi E h^3}\left[1 - \left(\frac{r}{R}\right)^2\right]^2$$

where R is the radius of the membrane and r the distance from the edge to the actual deflection point, v the Poisson ratio, E the Young's modulus and h the membrane thickness.

From the relation above it is observed that the deflection scales with $R^4$ and $1/h^3$. Already small variations membrane thickness and/or in size have a huge impact on the deflection profile. This relation is valid for films without any internal stress. If internal stress is taken into account the membrane becomes stiffer and the pressure to reach the touch point becomes larger.

If there is a certain residual pressure inside the cavity the internal pressure will change inversely proportional to the volume change according to Boyle's law. Consider for instance a 500 nm high cavity with a diameter of 75 μm that is covered by a 2.2 μm thick SiN membrane. Its volume is ~9000 μm³, which reduces to ~7600 μm³ at an outside pressure of 1 bar (100 kPa) (assuming vacuum in the cavity). This is indicated by the circled plot in FIG. 4, which shows the cavity volume reduction as function of applied external pressure for a cavity vacuum. The input parameters are 75 μm radius SiN membrane of 2.2 μm thickness (Young's modulus 220 GPa, Poisson ratio 0.3), the gap height is 500 nm.

Figure 4:
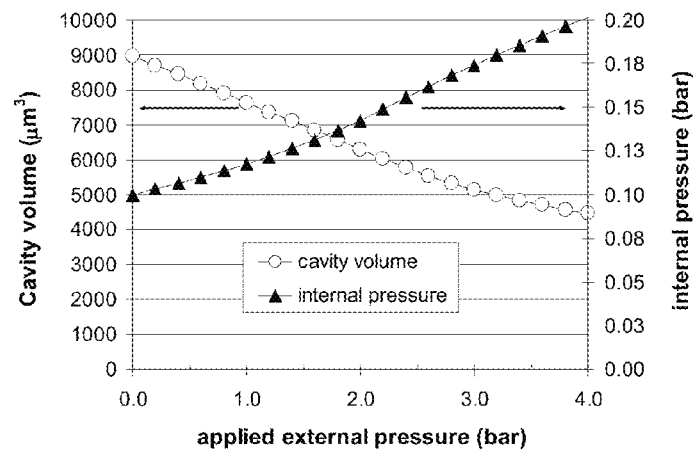
FIG. 4 shows the cavity volume reduction and pressure increase as a function of applied external pressure.

If the residual gas pressure in the cavity is 100 mbar (10 kPa) instead of vacuum (measured with vacuum outside) that pressure will rise to 120 mbar (12 kPa) if 1 bar (100 kPa) external pressure is applied. This is shown in FIG. 4 also, by the triangular plot, which shows the internal pressure change for an initial pressure of 100 mbar (10 kPa, and which is the pressure for an external pressure applied of 0.0 bar).

If the pressure in the cavity is not constant over time, e.g. due to out-gassing, the membrane will experience an additional but unknown force acting against the externally applied pressure. If the effect of pressure increase inside the cavity (of 100 mbar (10 kPa) in the example above) is not taken into account during calibration, the error increases with pressure. For example, due to membrane deflection the internal pressure increases to 120 mbar (12 kPa) at 1 bar and 145 (14.5 kPa) mbar at 2 bar (200 kPa). If the sensor is not regularly calibrated in a controlled environment this will lead to an unacceptable signal drift over time. Sensor calibration is difficult to perform in practical daily life situations because typically the sensors can not be taken out of their environment (e.g. medical implants, automotive pressure sensors, etc). In addition, if the gas inside the cavity expands due to a temperature increase the effect can not be corrected for if the internal pressure is not known.

Calibration provides a solution for potential signal drift.

For this purpose, it is important to determine the initial state and deflection behavior of the membrane in a calibration procedure and check from time to time whether any changes occur.

During a standard calibration several reference pressures would be applied to the membrane and the capacitance would be measured. Correction and calibration parameters would be extracted from the measurements and stored in a memory on the chip or circuit elements would be trimmed. These calibration data can comprise of, for instance, Capacitance-Pressure (C-P) data points taken in the appropriate pressure sensing range. Typically three or more C-P points are needed to be able to derive a high order polynomial fit through the data points. As the C-P relation is non-linear (see formulas below) the more calibration points are available the more accurate the polynomial fit will be. Other calibration possibilities are, for instance, a Capacitance Voltage (C-V) sweep. Such a sweep comprises accurate capacitance measurements under different bias voltages. Typically a C-V curve is taken between +20 and −20V at a spacing of 1V. Due to the attractive electrostatic force the membrane deflects towards the other electrode increasing the capacitance with increasing voltage bias (either negative or positive). A fit though the C-V data can be used to derive the membrane compliance which is a measure for the pressure sensitivity of the membrane. The C-V calibration method is a relatively quick calibration method which can be performed on wafer without using dedicated pressure chambers. The main advantage is that the method is quick and low-cost because the gathering of multiple C-P calibration data points can be avoided.

The Pirani sensor or resonator provide additional calibration possibilities during initial calibration but also during operation of the device. The approach is as follows:

Using the capacitive input of the first pressure sensor, a first estimation is made of the externally applied pressure using the calibration data in memory (C-P and/or C-V). The second pressure sensor (i.e. the Pirani sensor or the resonator) measures simultaneously the internal pressure inside the cavity. In the calibration procedure the internal pressure was also stored in memory as function of an externally applied force (e.g. pressure and/or an electrostatic force). The measured capacitance is directly correlated to the membrane deflection which determines the actual volume inside the cavity.

If for instance the membrane deflection is known at a certain pressure condition (e.g. the membrane is typically flat in vacuum) the volume change can be easily calculated for a certain pressure change. This value should correlate with the pressure reading of the second pressure sensor inside the cavity. This is a first check whether the sensor behavior is reproducible and accurate. This approach works better for relatively large (>10 mbar) cavity pressures. If the cavity pressure is close to vacuum the absolute change in back side pressure will be small and the second pressure sensor will not be able to detect a small difference. However, if outgassing occurs the second pressure sensor will be able to pick up the change in back side pressure. If the back side pressure was close to vacuum during calibration and after some time the back side pressure has increased to e.g. 1 mbar the absolute pressure reading can be corrected by adding the same amount i.e. 1 mbar to the output of the first pressure sensor. However, if the internal pressure reading during calibration was e.g. 100 mbar in vacuum and e.g. 150 mbar at 1 bar external pressure (the total cavity volume decreases in this case with 50% due to the membrane deflection) and at some point in time 165 mbar is measured this could be due to either a higher external pressure, due to outgassing, or a combination of both.

The capacitance measurement of the first pressure sensor should now be used to calculate the membrane deflection profile and the resulting volume reduction from the reference stale (i.e. the volume and pressure inside the cavity during calibration). If the volume reduction is determined to be e.g. 60% (due to a higher pressure), the pressure inside the cavity should be 160 mbar. The difference with the second pressure reading is caused by outgassing and can be used to calculate the true external pressure. The capacitance measurement of the first pressure sensor allows to determine the pressure difference over the membrane (i.e. the externally applied pressure minus the internal pressure). The measurement of the internal pressure serves several goals: Firstly, the internal pressure can be used for process control, check cavity sealing on wafer level prior to packaging, to monitor potential outgassing inside the cavity and correct for this, correct for temperature sensitivity at different external pressure.

If necessary, the initial membrane deflection can be easily measured using a white light interferometer as an additional input parameter that can be stored in memory to calculate the volume change.

In order to extract the C(P) dependence from the membrane deflection i.e. the deflection expression w(r,P) above, the following integral must be solved:

$$C(P) = \int_0^R \frac{\varepsilon_0 \varepsilon_r}{\varepsilon_r(g - w(r, P)) + h_{dielectric}} 2\pi r \, dr$$

The deflection profile w(r,P) can be described as the product of the central deflection $w_0(P)$ times the profile $z(r)$ which is a function of the radius. $z(r)$ depends on the material properties of the membrane: a bending-dominated membrane and a stress-dominated membrane have different profiles $z(r)$. For a bending-dominated deflection profile:

$$z(r) = \left(1 - \frac{r^2}{R^2}\right)^2$$

The membrane-center deflection $w_0(P)$ is reasonably well described by [Timoshenko, Theory of plates and shells, p. 392] and depends linearly with pressure P:

$$w_0(P) = \frac{0.23R^4(1-v^2)}{1.22Eh^3 + \sigma hR^2(1-v^2)} P$$

For stress-free as well as for stressed circular, clamped plates, as long as the stress is above (i.e. less compressive than):

$$\sigma_{crit} = \frac{-1.22Eh^2}{R^2(1-v^2)}$$

then the touch down or collapse pressure $P_{coll}$ can be found via $w_0(P_{coll})=g$. Hence, $$P_{coll} = \frac{gh(1.22Eh^2 + \sigma R^2(1-v^2))}{0.23R^4(1-v^2)}$$

For an effective gap height, g', the following relation can be derived taking into account the height, $h_{diel}$, and permittivity of the dielectric material in between the electrodes $\in_r$ and the actual gap or cavity height g:

$$g' = g + \frac{h_{diel}}{\varepsilon_r}$$

The capacitance as a function of center deflection $w_0$ is then:

$$C(w_0) = \frac{C_0}{2x} \ln\left(\frac{1+x}{1-x}\right) \text{ with}$$

$$x \equiv \sqrt{\frac{w_0}{g'}} \text{ and}$$

$$C \equiv \frac{\varepsilon_0 \pi R^2}{g'}$$

The center deflection is a function of pressure and defined by the gap distance and the collapse pressure $P_{coll}$ i.e. the pressure at which the center of the membrane touches the bottom of the cavity:

$$w_0(P) = \frac{g}{P_{coll}} P$$

The capacitance as a function of P can now be described by the following formula:

$$C(P) = \frac{C_0}{2y} \ln\left(\frac{1+y}{1-y}\right)$$

$$y \equiv \sqrt{\frac{gP}{g'P_{coll}}}$$

with
The pressure sensitivity which is the derivative dC/dP, can be written as:

$$\frac{dC}{dP} = C_0 \frac{g/g'}{4P_{coll}} \left\{ \frac{2y - (1-y^2)\ln\left[\frac{1+y}{1-y}\right]}{y^3(1-y^2)} \right\}$$

If the membrane is in its un-deflected state the sensitivity will be relatively low because the electrodes are separated far from each other (this occurs when the pressure difference is small between inside and outside). From FIG. 3 it becomes apparent that the sensitivity of the device is largest just before the top membrane is touching the substrate. Due to the decreasing distance between the plate electrodes, the capacitance increases non-linearly with pressure up to the point where the top electrode touches the bottom of the cavity. At pressures above the touch point pressure the capacitance shows a linear increase with pressure. For applications where a large sensitivity is required it is advantageous to define the pressure working range around the touch down pressure. For applications where linearity is required a pressure working range should be selected above the touch down pressure.

Figure 5:
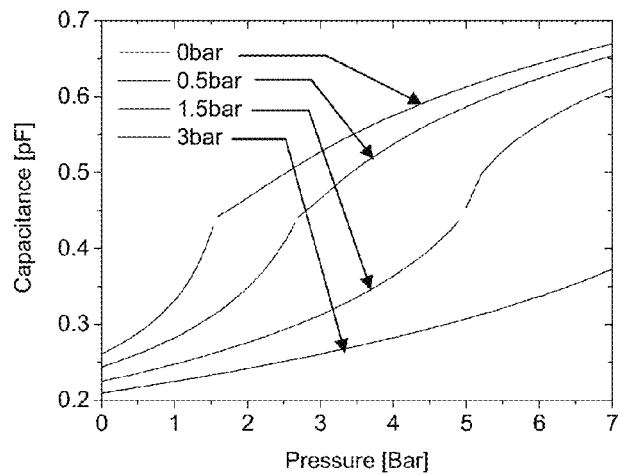
FIG. 5 shows an FEM simulation of capacitance and sensitivity as function of applied external pressure.

In conventional MEMS pressure sensors the touch point pressure will vary significantly depending on the initial deflection state of the membrane which is to a large extent determined by the geometry, stress, and the internal cavity pressure. FIG. 5 shows an FEM simulation of capacitance and sensitivity as function of applied external pressure assuming several internal cavity pressures. The input parameters are 75 μm radius SiN membrane of 2.0 μm thickness (Young's modulus 220 GPa, Poisson ratio 0.23 and 200 MPa tensile stress). The gap height, g, is 500 nm. As the membrane is approaching the bottom of the cavity the pressure increases with reducing volume and will require a larger external pressure for touch down. This effect is only present if the cavity is at a non-zero pressure in its un-deflected state (see FIG. 5). With residual gas pressure inside cavity a significant upward shift of collapse pressure occurs (>2× with residual pressure) in combination with a significant change in pressure sensitivity: Before collapse sensitivity goes down, after collapse sensitivity goes up. In addition, the temperature sensitivity increases due to the gas expansion effect (Boyle: P·V=n·R·T). The closer the pressure sensitive membrane is to the bottom of the cavity the higher the capacitance change will be whilst the internal pressure change will be only minor for small membrane displacements. So the impact of volume reduction on the pressure increase inside the cavity will be relatively minor. However, an increase in the cavity pressure due to outgassing can be easily captured and discerned from the calibration curve.

A pressure sensor with the reference pressure sensor allows to correlate the backside (external) pressure increase to the volume reduction independently from the measurement of the deflection of the membrane. So when the pressure inside the cavity is taken as reference gauge pressure this dual pressure measurement approach can be exploited to determine the membrane deflection in an independent manner. This approach works best when the dC/dP is still relatively small compared to the dV/dP i.e. when the pressure sensitive membrane is far from collapse (e.g. at low pressures). The resonator or Pirani measurements of pressure enable the same calibration function.

Most capacitance measurements involve simply a comparison of the capacitor to be measured with a capacitor of known value. This method can be applied to measure the capacitance ratio and find the zero deflection point of the membrane if identical electrode surfaces are being used. Such comparison can be performed frequently if one of the capacitors is substituted for the other at the same point in an electrical circuit.

Bridge comparison methods are very well suited to compare capacitors with high accuracy. Resistance-ratio bridges are Wheatstone-bridge configurations in which the potential division is measured of a variable capacitor and either a parallel combination of a standard loss-free capacitor Cs and a conductance Gs or a series combination of Cs and a resistor Rs. If these two parameters are equal to the ratio of potentials across two well defined resistors R1 and R2 the detector is nulled.

Time-constant methods rely on the measurement of the time constant of charge or discharge through a known resistor. If a voltage is applied in a step function fashion to a combination of an initially discharged capacitor and a resistor in series, the charge and the voltage on the capacitor increase exponentially toward their full magnitudes with a time constant equal in seconds to the product of the resistance in Ohms and the capacitance in Farads. Similarly, when a charged capacitor is discharged through a resistor, the charge and the voltage decay with the same time constant. The time or frequency of such a charge-discharge cycle can easily be determined with standard methods.

The use of a Pirani gauge will now be described in more detail.

The operation of the Pirani gauge is based on the pressure dependent heat transfer from a suspended, heated wire to a heat sink through gas molecule collisions. Normally, the heat is generated by the resistive heating of the wire. The electrical heating (Qel) is equal to three thermal loss components. The first one is the thermal conduction between the heater and heat sink through the gas, (Qgas(P)), which is pressure P dependent since the thermal conductivity of the gas depends on the pressure when $Kn=\lambda/d \gg 1$; where Kn is the Knudsen number, $\lambda$ is the mean free path of the gas, d is the characteristic dimension of the domain. The second one is the thermal conduction through the contacts (Qend), and the third one is the thermal radiation (Qrad):

$Q_e(P)=Q_{gas}(P)+Q_{end}+Q_{rad}$

With reasonable approximation, the pressure dependent heat flux from the heater to the gas is modeled as:

$$Q_{gas}(P) \cong Q_\infty \left[ \frac{P/p_0}{1+(p/p_0)} \right]$$

Where $Q_\infty$ is the heat flux from the heater to the gas at high pressure, which limits to a constant; $P_0$ is an empirical transition pressure which determines the upper limit of the dynamic range. $P_0$ is inversely proportional to the gap size between the heater and heat sink. The lower pressure limit is more sensitive to the active area of the sensor. Hence, to enlarge the dynamic range of the micro Pirani sensor, the gap size should be small and its active area should be increased. In addition, if the structure is fully surrounded, i.e. on the bottom and on each side, the area of heat dissipation is tripled allowing lower pressures to be measured as compared to existing Pirani devices. The small gap between the heater and two side walls can be precisely defined by photolithography, the bottom distance is defined by the SOI thickness.

Three heat sinks are used, which include the substrate beneath and two side was surrounding the heater. In this way, the area of the heat loss through gas is greatly increased thereby increasing the dynamic range of the sensor without increasing the dimension of the sensor. The gap between the heater and the two side was can be precisely tuned with micromachining technologies comprising of photolithography and deep reactive ion etching. The gap is typically between 200 nm and 1000 nm. As a consequence, it will ensure a high upper pressure limit of the sensor.

The mean free path $\lambda$ depends on the temperature T, the radius of the colliding molecules r, Avogadro's number $N_A$ and the pressure P:

$$\lambda = \frac{RT}{4\sqrt{2} \cdot \pi r^2 N_A P}$$

This implies that the mean free path is in the order of 2 μm at 100 mbar (10 kPa) for an average molecule diameter of 3 Å, whereas at a pressure of 1 bar (100 kPa) the mean free path drops to 200 nm. This example shows that for low pressure the gas molecules only collide with the heated wire and the walls of the heat sink. As the frequency of molecular collisions is proportional to the gas pressure, the pressure also determines the heat transfer rate when the Knudsen number is larger than 1.

Figure 6:
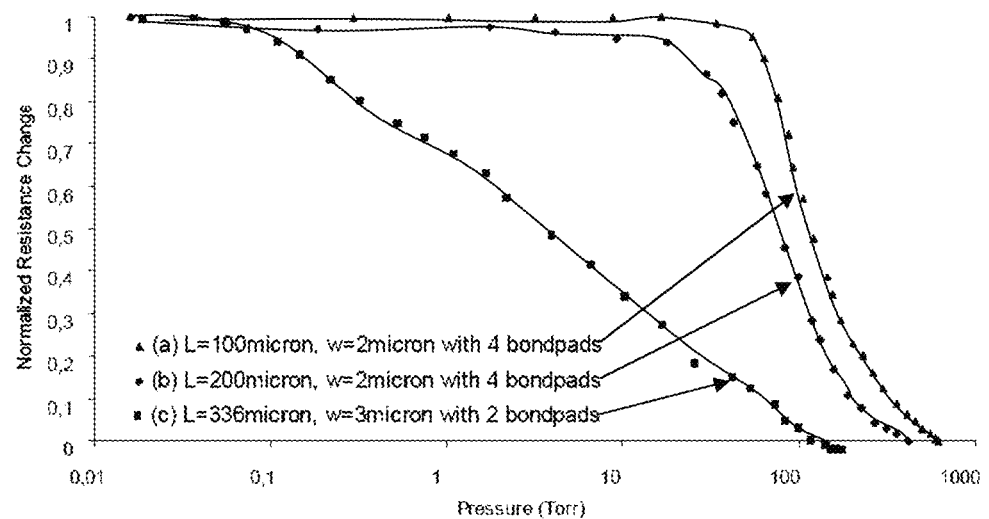
FIG. 6 shows a normalized resistance change for three different configurations of Pirani sensor.

A four-point probe electrical measurement was used to determine the resistance change of the Pirani gauge under pressures ranging from vacuum to atmospheric pressure. FIG. 6 shows a normalized resistance change for three different configurations.

(a) Pirani device with four bondpads, length 100 μm, width 2 μm, thickness 1.4 μm;

(b) Pirani device with four bondpads, length 200 μm, width 2 μm, thickness 1.4 μm;

(c) Pirani device with two bondpads, length 336 μm, width 3 μm, thickness 1.4 μm.

From the measurement results, sensors (a) and (b), which only differ in length, are able to measure 40 torr (5.3 kPa) to 500 torr (67 kPa) and 10 torr (1.3 kPa) to 480 torr (64 kPa), respectively. The longer one is capable to detect a smaller pressure and a larger dynamic range due to larger heater area which is consistent with the theory. Sensor (c), with only 336 μm in length is capable to measure a very large pressure range, i.e. from 80 mtorr (11 Pa) to 200 torr (27 kPa). It shows a dynamic range that is larger than ever been reported with surface micromachined silicon Pirani devices. The three heat sinks greatly enlarge the dynamic pressure range of the sensor. Depending on the device dimensions/configuration it can be concluded that the Pirani gauges works perfectly in the range between 1 and 200 mbar (100 Pa to 20 kPa).

By using a Pirani gauge inside the cavity a unique relation can be obtained between the deflection profile of the membrane (i.e. the capacitance) and the pressure increase due to the volume reduction explained above. Under all circumstances the sensor integrity can be verified by looking at the calibration curve. The reference Pirani gauge in a cavity that is not sensitive to pressure can be used to determine the absolute increase in pressure due to outgassing. Furthermore, a temperature meter can be integrated together with the read-out electronics to compensate for changing ambient temperatures.

If there is a certain initial pressure inside the cavity, the heat dissipation of the suspended wire will change significantly due to gas compression if the large pressure sensitive membrane becomes deflected. In this case the increase in heat dissipation can be used as a measure for the external pressure as well due to the volume reduction of the deflecting pressure sensitive membrane.

The heat loss can be determined by measuring the resistance change over the suspended beam using a four point probe. In order to cancel out resistance changes due to thermal expansion effects the heated wire is formed as one leg of a balanced Wheatstone bridge. The gas molecules that collide with the wire transfer heat away from it and unbalance the bridge relative to a reference state. Since the frequency of the collisions is proportional to the gas pressure, the voltage to keep the bridge in balance is proportional to the pressure.

The Pirani sensor layout can be optimised.

Ideally, the wire has a high temperature coefficient of resistance. For example, a doped MEMS Si beam is constructed on a SOI wafer having sufficiently large surface area in close distance to the heat sink surrounding the wire. A Pirani device with two bondpads, length 336 µm, width 3 µm, thickness 1.4 µm shows an optimal sensitivity in the anticipated pressure regime of the cavity of the pressure sensor.

The Pirani gauge sensing element needs a low electrical resistance (so that a large power dissipation can be obtained at a low operating voltage) and at the same time a large temperature coefficient (to detect the pressure difference) and a large area (to be more sensitive to pressure differences) . These are conflicting requirements because a large temperature coefficient for silicon requires low doping concentration and in combination with a large wire length of the sensor element this results in a large resistance. Therefore a simple wire is not the optimal shape for the Pirani gauge sensing element. The wire can be short but with large cooling fins structures to it.

The above values for the Pirani gauges and the dependence on pressure are examples only. By adjusting the geometry of the wires and its environment these values can be tuned to the application.

The use of a resonator will now be described in more detail.

The resonance frequency of an electrostatic excited membrane, cantilever or dogbone is a measure for the mechanical compliance of the membrane (loading the membrane will shift the resonance frequency). The resonance frequency can be determined by measuring the electrical impedance between both actuation electrodes as a function of frequency while applying a DC bias voltage, Vdc, across the resonating structure. The membrane is thus excited by the electrostatic force and its motion is detected by measuring the capacitive current, which is a result of the fact that the capacitance between the opposite electrodes is a function of the distance z0+Δz. Alternatively the device can be configured in a feedback loop with an amplifier to create a MEMS oscillator that continuously generates an AC output signal with a frequency that depends on the external pressure. The frequency can be determined using any conventional way of measuring resonance frequencies of MEMS, mechanical resonators, or RLC circuits. For instance, an oscillator can be built that locks to the resonance. However, the frequency shift due to pressure variations is rather small and not very suited to determine the pressure inside the cavity.

Figure 7:
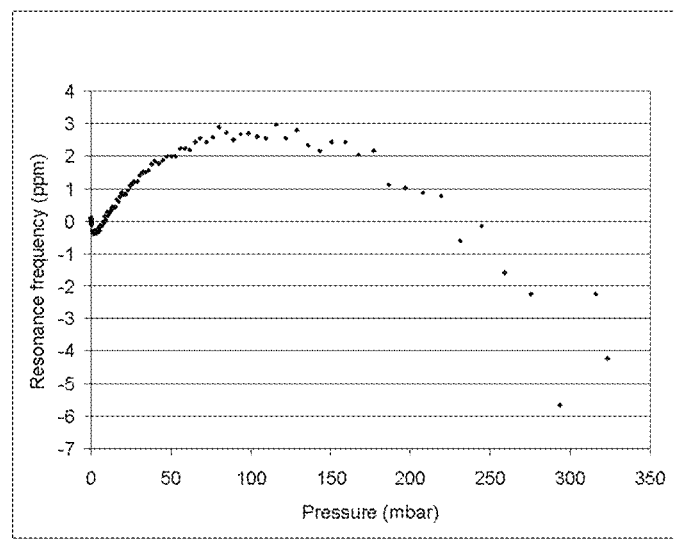
FIG. 7 shows the resonance frequency as a function of pressure for a resonator.

FIG. 7 shows the resonance frequency as function of pressure.

The resonance frequency of the output signal is subject to peak broadening at elevated pressures. Hence, determination of the quality factor is a direct measure for the pressure.

The quality factor can be determined using a frequency sweep and taking the Full Width at Half Maximum at the resonance frequency. Another method is based on using the gain that must be applied to keep an oscillator in resonance ("ringing"). The signal amplification gain is a direct measure to achieve a certain oscillation amplitude and consequently also the width at the resonance frequency.

Preferably a MEMS resonator is constructed on a SOI wafer using electrostatic actuation and a piezo resistive read-out.

Figure 8:
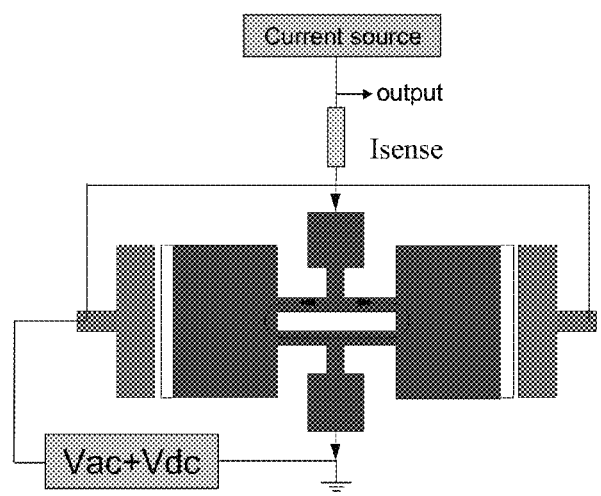
FIG. 8 shows a schematic top view of dog bone resonator with piezo resistive read-out manufactured in SOI.
Figure 9:
FIG. 9 shows a SEM cross section of dog bone resonator with piezo resistive read-out manufactured in SOI.

FIG. 8 shows a schematic top view and FIG. 9 shows a SEM cross section of dog bone resonator with piezo resistive read-out manufactured in SOI.

A dogbone like resonator is excited by the electrostatic force and its motion is detected by measuring the current that is modulated by the piezo-resistive effect. Silicon resonators are known to be temperature dependent. Small changes in frequency caused by pressure changes will therefore be difficult to measure unless a good reference is present. By incorporating close to the pressure sensor a second resonator identical to the first one in a separate hermetic cavity, temperature differences can be compensated for by comparing the resonance frequencies of the two devices. Ideally also a temperature sensor can be co-integrated in the read-out circuitry to cross-correlate the impact of temperature on thermal gas expansion and the Q factor change of the resonator.

Figure 10:
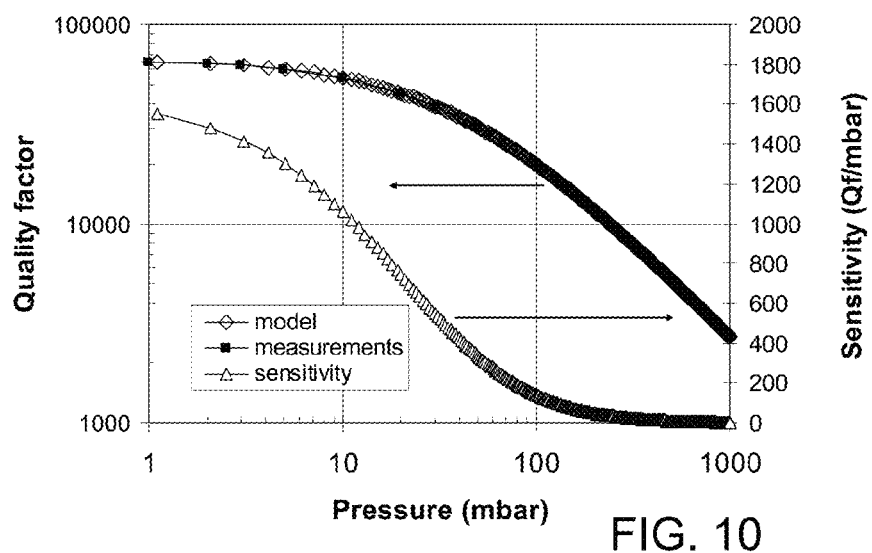
FIG. 10 shows the quality factor of the resonance frequency of a resonator as a function of pressure.

If the pressure inside the cavity is within a certain range (i.e. larger than 1 mbar (100 Pa) and smaller than 1000 mbar (100 kPa)), the quality factor of the resonance frequency can be used as a measure for the internal pressure. This is shown in FIG. 10, which shows the Quality factor and sensitivity of resonator resonating at 56 MHz, showing the rapid decrease in sensitivity at high pressure.

Below 1 mbar (100 Pa) the quality factor hardly changes (it levels off to a constant value at 67000). At higher pressure the resonator movement is damped due to collisions with the surrounding gas. At 1 bar (100 kPa) the quality factor drops below 1000. Above 1 bar (100 kPa) it becomes rather difficult to measure pressure accurately. At very low pressures the resonator movement is not significantly damped and the pressure sensor will not be able to detect small changes in its fundamental resonance mode. However, also out-of-plane resonance modes exist that can be used to detect even lower cavity pressures at a much higher sensitivity. The detection of out-of-plane movements, however, requires a capacitive measurement perpendicular to the electrostatic force which is directed in plane.

Figure 11:
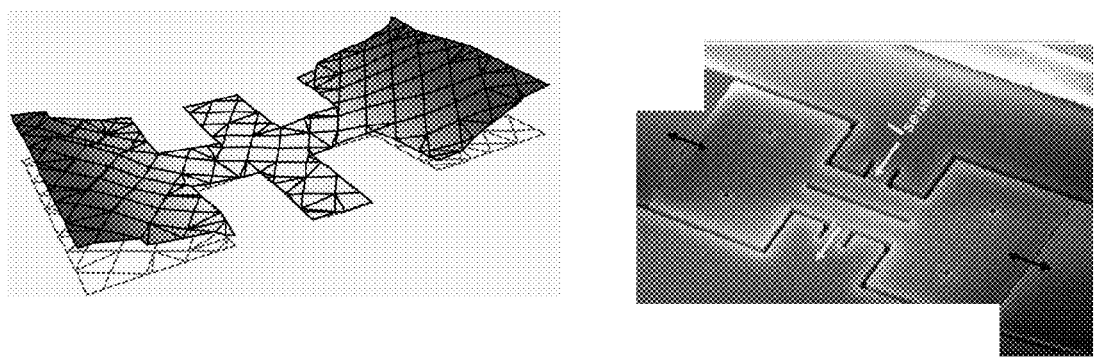
FIG. 11 shows the out of plane movement of a dog bone resonator.

FIG. 11 shows the out of plane movement of a dog bone resonator resonating at 56 MHz (50 nm out of plane movement vs. 1-2 nm in plane movement due to actuation).

If there is a certain initial pressure inside the cavity, the quality factor of the resonating structure will change significantly due to gas compression if the large pressure sensitive membrane becomes deflected. In this case the quality factor of the resonance frequency can be used as a measure for the external pressure as well due to the volume reduction of the deflecting pressure sensitive membrane.

The quality factor Q is a function of the pressure P according to the following relation:

$$Q = \frac{Q_{init}}{\left(1 + \frac{\alpha \cdot Q_{init} \cdot P}{2\pi \cdot \rho_{Si} \cdot V_{res} \cdot f_{res}}\right)}$$

where Qinit is the quality factor of the resonator in vacuum, fres is the resonance frequency, α is an empirical fit parameter, ρSi is the density and Vres is the volume of the silicon resonating beam.

For instance, if the residual gas pressure in the cavity is 100 mbar (10 kPa, when the outside pressure is 0 bar) the pressure inside the cavity will increase to ~120 mbar (12 kPa) if the external pressure is increased to 1 bar (100 kPa) (volume of a 75 μm diameter, 500 nm large cavity is ~9000 μm$^3$ and reduces to ~7600 μm$^3$ cavity at 1 bar if a 2.2 μm thick SiN membrane is used. If the effect of pressure increase inside the cavity is not taken into account, the error is 20 mbar (2 kPa) at 1 bar and 45 mbar (4.5 kPa) at 2 bar (200 kPa).

The pressure increase within the cavity becomes therefore also a measure for the deflection of the membrane. In order to use this technique, the pressure inside the cavity should be smaller than 100 mbar (10 kPa) in order to detect a sufficiently large change in quality factor (for example a change from 100 mbar (10 kPa) to 145 mbar (14.5 kPa) (i.e. 0 bar to 2 bar (200 kPa) external pressure) results in a quality factor change ΔQf of 20000 to 15000 (i.e. 140 ΔQf/mbar). Typically with the materials and processing used within the PECVD SiN membrane flow an internal pressure of 30 mbar (3 kPa) can be achieved.

The above values for Q factor and the dependence on pressure are examples only. By adjusting the geometry of the resonator and its environment these values can be tuned to the application.

A combination of inputs can be used. When there is input from 2 pressure sensors they need to be combined to derive an accurate external pressure. The process can involve:
  determine deflection z of membrane by measuring capacitance
  determine pressure inside cavity Pin
  compare stored value(s) of both reference pressure inside cavity and reference deflection profile with the current deflection profile and internal pressure: The internal pressure should behave according Boyle's law and hence any change in Pin can be calculated back to the value it should have at a given deflection.
  adjust Pout for any drift in Pin taking also into account the temperature. A temperature sensor can be co-integrated in the read-out circuitry to cross-correlate the impact of temperature on thermal gas expansion and the Q factor change of the resonator.

The most convenient way to adjust the pressure range within a consolidated process flow is to adjust the membrane radius and not the membrane thickness, nor gap height, nor to fine tune the internal stress of the membrane. A realistic gap height from manufacturing point of view varies between 300 nm to 1000 nm. Smaller gaps will induce problems with the removal of the sacrificial layer especially if the membrane radius is large (long etch times are required which poses constraints on the selectivity of the etchants). Large gaps are more costly to manufacture and create additional topography. The thickness of the membrane is typically chosen to be equal or larger than the gap distance to keep the device in the flexural rigidity controlled regime. This is beneficial because this reduces the impact of residual stress due to process variations on the deflection profile.

There are several ways to improve the dynamic range of a pressure sensor.

One option is the use an array of pressure sensors with different membrane size. As the deflection scales with 1/R$^4$ only small variations in membrane radius are required to cover a large pressure range.

The dynamic range can be further increased when the non-linear C-P response is combined with the linear C-P response after "touch down" of the membrane. However, the touch down pressure can vary significantly from die to die depending on the membrane thickness, stress, and the internal cavity pressure. Therefore, an independent measurement of the cavity volume change would be an interesting asset to extend the operating range.

Hence, a detection routine using the capacitance input of a deflecting membrane in combination with the data on the internal pressure increase from the pressure sensor (Pirani Gauge or resonator) increases the accuracy, signal to noise ratio, and pressure sensitivity in a large dynamic range.

The consecutive steps of an exemplary process flow are given in FIG. 12A to 12K for a capacitive pressure sensor including a Pirani gauge or resonator.

Starting with a SOI wafer 120 (1.0 um BOX, 1.5 um SOI) a 10 nm thick thermal oxide 122 is grown (FIG. 12A). Then zero markers are applied using standard lithography and etch (Mask 1).

A HF 2% etch is used to remove 10 nm of oxide and clean the wafer. The wafer is then re-oxidized with 20 nm thermal oxide (pad-oxide) as masking layer for the first implant. The NWELL implant 124 is performed after NWELL litho (Mask 2) to define the resonator structure or the Pirani gauge (FIG. 12B). The wafer is stripped (using a high-dose implant strip) and annealed (pre well drive anneal for 22' at 950° C.) and the implant oxide is removed in 2% HF.

Then a hard mask 126 is deposited (320 nm TEOS oxide) to allow patterning of the trench areas for the cavity and pressure sensor (FIG. 12C). The wafer is patterned with lithography (Mask 3) and the SiO2 layer is etched and stripped. This is followed by the Si trench etch using deep reactive ion etching. The Si etch stops on the BOX layer and is followed by a strip.

Subsequently the hard mask is removed using 2% HF and a long etching time. This is followed by thermal oxidation 20 nm. This forms a uniform oxide 128 on trench side-walls to prevent out-diffusion. Then the well drive (a high temperature anneal (e.g. 1175° C. for 2 h) to activate the dopants that were implanted during NWELL implant step 124) is performed (anneal at 1175° C. for 2 h). If this step is completed the bottom electrode and the contacts are patterned using lithography and NPLUS implants 130 (Mask 4) followed by strip and activation anneal (anneal for 27' at 950° C.) (See FIG. 12D).

The next step is the release of the resonating structure/ heated wire structure (depending on the type of pressure sensor) in HF vapor (FIG. 12E). The BOX should be etched sufficiently long to make a physical connection to the trench that gives access to the pressure sensor cavity 132. After release a pad oxide 134 is grown by thermal oxidation 20 nm in order to prevent alloying of Si and Al when Al is deposited as sacrificial layer.

This is followed by the (PVD) deposition of a sacrificial layer 136 which will be removed later on to form a cavity (FIG. 12F).

The sacrificial layer consists of a 1.0-1.5 μm thick metallic layer (typically Al/Cu). The trenches and underlying cavities are closed. This sacrificial layer is patterned and etched (Mask 5) in an appropriate circular shape with flaps for the pressure sensor in order to access this layer outside the circular membrane area for the sacrificial etch. The Al etch should stop on the 20 nm pad oxide. A larger sacrificial film thickness creates a larger gap and results in an overall a smaller sensitivity but a larger dynamic pressure range. A small sacrificial film thickness could result in more processing difficulties upon removal of the sacrificial layer but is advantageous to increase the capacitance between the parallel plate electrodes as high as possible.

The sacrificial layer deposition is followed by the deposition of a PECVD silicon nitride capping layer 138 (FIG. 12G). This particular membrane is typically 0.5-1.5 μm thick and serves as etch protection for the top electrode during the sacrificial layer etch. The thickness & stress of this layer influences the final rigidity of the membrane. The stress in the SiNx:H layer can be tuned with the deposition conditions. Preferably the membrane diameter is optimized in order to define a certain pressure operating range for a given SiN membrane thickness. Typically the membrane thickness is chosen to be between 1.5 um and 2.5 um for membrane diameters between 50-75 um which yield a sufficient broad dynamic pressure range between 0.5 and 5 bar (50 kPa and 500 kPa). For low pressures (i.e. <0.2 bar i.e. <20 kPa) the thickness of the membrane must be decreased to 300-500 nm in order to create a much more flexible membrane. The SiN deposition is followed by a furnace anneal at 450° C. to densify the membrane.

The nitride membrane is subsequently patterned (Mask 6) to open the contact holes and sacrificial etching holes. The dry etch is performed of SiN and SiO stopping on Si and Al sacrificial layer. These holes are placed circumferentially around the membrane i.e. outside the circular electrode area and are typically 1-2 um in diameter. The larger the hole diameter the easier the sacrificial material can be removed.

The cavity is formed during sacrificial layer etch through the etch openings 140 (FIG. 12H). The Al layer can be selectively removed with a PES etch (mixture of Phosphoric acid, Nitric acid, and Acetic acid) a PS etch or simply with ammonia. The disadvantage of using wet etch approaches is that the membrane could stick to the underlying substrate due to the capillary forces. Although the membranes can be released using critical point drying, dry etch methods are preferred for the sacrificial layer etch. In this respect a chlorine dry etch is able to remove selectively Al from the cavity without etching the nitride or BOX layer.

After release the membrane is further densified in a furnace anneal at 450° C.: any residual water is removed from the cavity and residual hydrogen gas is removed as much as possible from the membrane.

"Hot" PVD Al is deposited at 350° C. chuck temperature. Upon using "Al-reflow" during the non-conformal Al deposition the etch holes will effectively seal the hole without a "seam" at PVD base pressure (FIG. 12I). The required thickness of the Al layer 142 for effective closure depends on the diameter of the hole and the gap diameter and is typically in the order of 2-3 μm. For a large gap heights (e.g. 5 μm) in combination with large etch holes (e.g. 2 μm diameter) a rather thick Al layer (5 μm) is required for closure. Although the cavity is sealed at PVD base pressure the cavity pressure typically increases up to 30 mbar (3 kPa) due to hydrogen out-gassing (see discussion below).

In this example of process, a Physical Vapor Deposited (PVD) metallic plug is used to seal the cavity. This is beneficial to reduce the base pressure and avoids undesired pressure variations in the cavity due to thermal expansion of the gas. Moreover, the pressure sensor can be manufactured in the same flow as the reference pressure sensor without any change in process flow reducing mask costs. If the cavity is sealed using a dielectric film such as SiN or SiO2 employing deposition techniques such as PECVD or LPCVD the base pressure in the cavity will be determined by the pressure in the deposition chamber during the deposition process which is typically much higher than in PVD chambers.

FIG. 12J shows electrode patterning of the Al layer 142 to form a top electrode 144 for the pressure sensor and a capping layer 146 for the sensor.

After electrode patterning a SiN passivation layer 148 (FIG. 12K) is applied. In order to reduce the stress gradient the SiN thicknesses below and above the metal electrodes could be adjusted so that the Al electrode is positioned in the middle of the membrane. Electrical connections and bond pads are created by subsequent patterning (Mask 8) to create openings 150. Etching openings into of the SiN layer is using standard manufacturing methods.

FIG. 12K is the final cross section after opening of the bond pads in the passivation layer.

Although airtight cavities can be manufactured with PECVD SiNx:Hy membranes, pressure could potentially rise in time when exposed to harsh environments (e.g. operation at elevated temperatures, H2 diffusion into the cavity from the outside due to H+ generation and recombination with electrons at the opposite electrode). In addition, hydrogen effusion from the SiNx:Hy capping membrane could take place depending on the PECVD deposition conditions and the resulting SiNx:Hy composition of the film. The hydrogen content depends on the deposition conditions with more hydrogen being incorporated if deposition temperature is decreased. Also the post deposition annealing conditions (i.e. before closure of the cavity) plays a role in the extent of out-gassing of hydrogen into the cavity.

Figure 13:
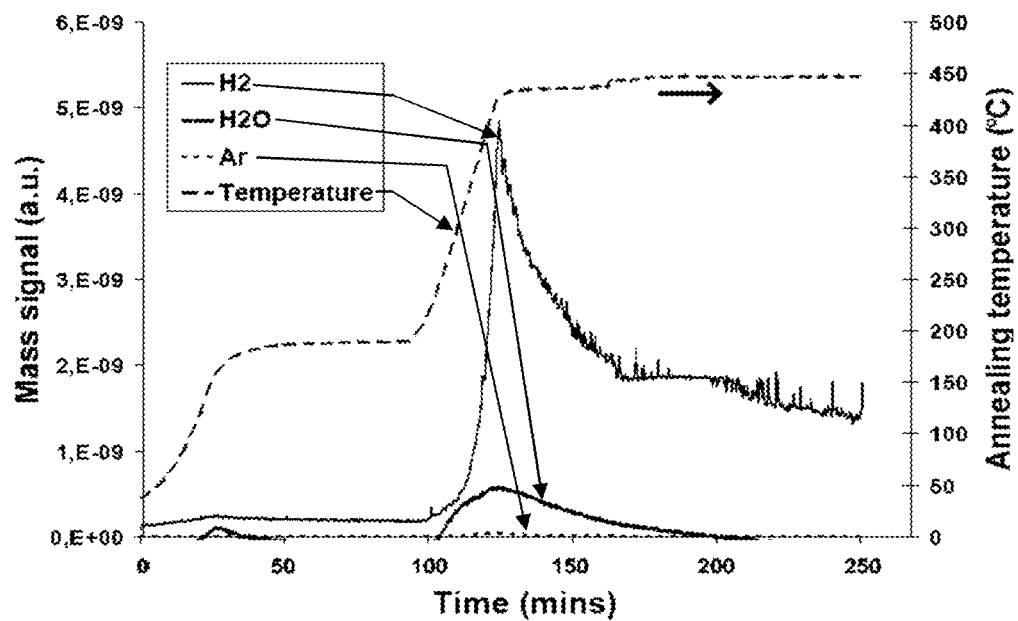
FIG. 13 shows the hydrogen water effusion from PECVD SiNx:Hy films as function of annealing temperature.

FIG. 13 shows the hydrogen water effusion from PECVD SiNx:Hy films as function of annealing temperature. It is important to cure the membrane before the cavity is closed. If PECVD SiNx:Hy sealing approach would be used to close the holes, any anneal afterwards would generate a significant pressure build-up in the cavity.

Figure 14:
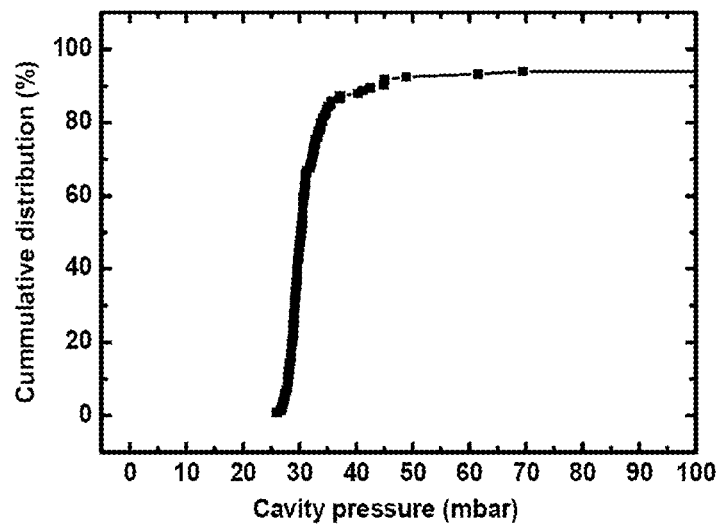
FIG. 14 shows the cumulative distribution of pressure in SiN capped cavities with PVD Al plug after packaging.

The density of the PECVD films and consequently the diffusion barrier behavior can be improved using higher deposition temperatures and upon applying subsequent anneals. Under appropriate PECVD conditions a high density, nitrogen-rich SiN film is obtained (Table 1). SiN materials that are over-stoichiometric in nitrogen have been shown to give particularly low out-gassing under annealing at 450° C. Upon incorporating such a SiN film as part of pressure membrane the relative extent of out-gassing can be minimized and a low internal cavity pressure can be maintained at approximately 30 mbar (30 kPa) as shown in FIG. 14, which shows the cumulative distribution of pressure in SiN capped cavities with PVD Al plug after packaging.

TABLE 1

Impact of hydrogen out gassing depending on the density and composition of the Si:N:H films after anneal at 450° C.

| Si:N:H Composition | Density ($10^{22}$ atm/cm$^3$) | Cavity pressure from exodiffusion (mbar) |
|---|---|---|
| A | 1:1.1:0.5 | 8.3 | 137 |
| B | 1:1.1:0.5 | 7.5 | 17 |
| C | 1:1.5:0.5 | 9.2 | 5.6 |

In one example of the invention, a capacitive pressure sensor and Pirani pressure gauge can be formed on top of a CMOS circuit. The CMOS circuit can then be used as the read-out circuit for the pressure sensor, and it comprises a wafer with a multilevel interconnect arrangement.

FIG. 15 is used to explain an example of the process flow.

FIG. 15A shows the top metal layer 151 of the interconnect arrangement of the CMOS circuit, with interconnections extending down to the lower CMOS layers. The top of the circuit has an oxide layer 152 (e.g. 1000 nm thick high density plasma oxide) and a PECVD passivation layer 153, for example 600 nm of SiN.

Vias are etched through the passivation layer and oxide to the top metal layer with a first mask, and these vias are filled with Tungsten by a CVD process, followed by planarization which stops on the silicon nitride layer. The resulting structure with filled vias 154 is shown in FIG. 15B. The vias may have a diameter of 0.7 μm.

Aluminium bottom electrodes 155 are formed, and a second mask is used for the patterning. A SiC layer 156 is then provided over the electrodes to prevent short circuits between the top and bottom electrodes and avoid etching of the SiN passivation layer during the sacrificial etch (described below). The resulting structure is shown in FIG. 15C.

The sacrificial layer 157, for example SiO2, is then deposited. The required gap to be formed by the sacrificial layer is around 0.5 μm to 1 μm. An oxide fill can be carried out before the sacrificial layer deposition in order to planarize the underlying surface, if the topography requires this. This oxide layer can then be planarized down to the SiC layer 156 to provide a flat surface on which to deposit the sacrificial layer.

A via pattern is formed in the sacrificial layer 157, again for example with via diameters of 0.7 μm. This uses a third mask. The vias extend through the sacrificial oxide and the SiC 156 layer down to the bottom electrodes 155.

The top electrode material 158 is then deposited, such as tungsten. The resulting structure is shown in FIG. 15D.

The tungsten layer need to be thick enough to fill the vias and form a stable membrane after the sacrificial etch. For example, a thickness of greater than 400 nm can be used.

The top electrode can instead be formed of SiGe, for example by a two stage deposition process. A first CVD process provides the required thickness layer to fill the vies (e.g. 400 nm), and a second thicker PECVD SiGe film is deposited for example with thickness 3 to 4 μm. This is carried out using a lower tensile stress deposition, for example 20 MPa to 60 Mpa.

In FIG. 15D, the Pirani cavity is shown as 160 and the capacitive pressure sensor cavity is shown as 161.

The top electrode 158 is then patterned. A fourth mask can be used for bond pad electrical separation (for example with pattern size 2 μm) and a fifth mask can be used to form the sacrificial etch release holes (for example with pattern size 0.5-0.7 μm diameter). Small diameter sacrificial etch holes are desired to allow rapid closure during an annealing step.

An oxide deposition is then carried out to form a cavity above the Pirani wire, and results in the structure shown in FIG. 15E. The top oxide is shown as 162.

The top electrode patterning defines a free hanging part 163 of the Pirani gauge, the pressure sensor membrane 164 and an electrode/suspension structure 165 for the Pirani gauge.

The top sacrificial oxide layer 162 is then patterned using a sixth mask to form a cap over the free hanging part 163 and the electrode 165 of the Pirani gauge. A top aluminium electrode layer 166 is then deposited and patterned (mask 7) to form the structure shown in FIG. 15F.

In FIG. 13F, the contact 170 is the Pirani electrode contact, the contact 172 is the contact to the top electrode of the capacitive pressure sensor and the contact 174 is the contact to the bottom electrode of the capacitive pressure sensor. The contacts route through the top metal layer of the CMOS circuit as clearly shown for the contacts 170 and 174.

The sacrificial etch is then carried out using a HF vapor etch. This requires selectivity to the SiC layer 156 and the W or Site layers. The cavity of the Pirani gauge is accessible via spaces between the supporting anchor parts of the capacitive pressure sensor.

Finally, a capping layer 176 is applied as shown in FIG. 15G. This can be SiN formed using a PECVD process, TEOS formed using a CVD process, or SiC formed using a PECVD process. A typical thickness is 1 to 2 μm. This capping layer is patterned (mask 8) to enable access to the electrode contacts as shown in FIG. 15G. The capping layer design determines the pressure response and the outgassing performance of the sensor.

Some advantages of this process flow include:

- SiGe or W films can be deposited on top of CMOS structures at 400° C. without degradation of metal line resistance or transistor performance;
- Stable SiGe or W films do not show creep and have well controlled bending deflection profile (low tensile stress).
- There is a small thermal expansion coefficient mismatch of SiGe or W electrodes to Si so that buckling can be avoided
- There can be a low temperature sensitivity of the membrane
- the use of a thin PECVD SiC layer on top of the bottom electrode provides good dielectric isolation, and the device can be operated in collapse (with no shorts between top and bottom)
- A small pressure sensor performance is spread over the wafer. The membrane thickness and cavity height have good uniformity because they are defined by deposition parameters rather than by planarization steps.

Various membrane shapes are possible, including circular membranes and rectangular suspended membranes.

For maximum displacement, the most robust shape against a large stress gradient is the circular plate, but hexagonal, square or rectangular shapes are also possible. From modeling perspective a circular model is also preferred because analytic solutions exist for the deflection profile.

The chosen method for packaging the device is based on keeping the membrane sensor area free in order to allow deflection of the membrane and detect pressure changes. For this purpose a non sticking foil is applied over the die and a plunger larger than the size of the membrane is pushed against the die when the molding compound is injected at high pressure in the packaging mould. When the plunger and the mould are released the foil is removed from the membrane. The plunger protects the membrane against the high pressure and the deposition of moulding compound onto the membrane.

The combined capacitance and internal pressure sensor design is ideal for internal sensor calibration: a function that does not exist in MEMS pressure sensors yet. Moreover, the use of the internal resonator allows to perform a sanity check (to verify if is the sensor still functional within the predetermined limits and therefore stable). Reliable calibration is crucial for MEMS devices where small variations in geometry and or material properties have a huge impact on the sensor performance.

For the example of Pirani pressure sensors, pressure sensing methods using a Pirani gauge are known. The problem with this type of pressure sensing is that the heated wire must be suspended in the environment to be sensed which makes them not useful for most pressure sensor applications (sensing in reactive gases or in liquids). In the design of the invention, the heater element is encapsulated and thus shielded from the environment which allows usage in for instance explosive sensitive applications. Moreover, the Pirani gauges work best at relatively low pressures which limits their use for ambient or high pressure applications. In addition, a minimal current is required for reliable operation which makes them less suited for ultra low power applications as well. Instead, the approach of the invention employs the Pirani gauge for calibration or signal drift correction. For certain applications the external pressure can be determined indirectly via the increase of the internal pressure due to the volume reduction. In combination with a standard capacitance measurement the accuracy and signal to noise ratio can be improved. Essentially, the window of operation of the Pirani sensor is increased to higher pressure levels.

For the example of resonance mode pressure sensing, pressure sensing methods using a resonating membrane or cantilever are also known. The membrane is brought into resonance by applying an alternating electrostatic field to the opposing electrodes. The problem with this type of pressure sensing is that it can only be applied in gases and at relatively low pressures which makes it not useful for most pressure sensor applications (sensing in ambient air or in liquids). The problem of using the method of resonance frequency peak broadening is that at large pressures i.e. >1 bar (100 kPa) the Q factor becomes really low which makes pressure measurements inaccurate at ambient pressures. Instead, the approach of the invention employs the Q-factor of the peak resonance on the inside of a hermetically sealed cavity that is kept at a low pressure. The external pressure is now determined indirectly via the increase of the internal pressure due to the volume reduction. In combination with a standard capacitance measurement the accuracy and signal to noise ratio can be improved.

The invention preferably uses differential sensor read-out. Differential pressure sensors typically consist of two separate pressure gauges, one exposed to the medium that needs to be sensed and the other exposed to a reference pressure. This approach is beneficial to correct for thermal expansion of the devices. However, the differential read-out is not a solution for signal drift due to cavity out-gassing. Differential read-out is typically performed using the same read-out techniques (e.g. a capacitive read-out) in order to compare a constant input with a variable input. This requires two identical and well separated structures. This is in contrast to the approach of the invention which is carried out in the same cavity but with different read-out techniques.

The pressure increases inside the cavity due to reduction of the cavity volume. This value can be correlated to the capacitance read-out of the deflecting membrane. If there is a low but residual pressure inside the cavity the heat dissipation due to conduction structures will increase due to the gas compression if the large pressure sensitive membrane becomes deflected. For instance, if the residual gas pressure in the cavity is 100 mbar (10 kPa) when the outside pressure is 0 bar the pressure inside the cavity will increase to ~120 mbar (12 kPa) if the external pressure is increased to 1 bar (100 kPa) (75 μm diameter, 2.2 μm thick SiN membrane, and 500 nm gap. Therefore, the relative error due to the pressure increase inside the cavity amounts 20 mbar (2 kPa).

The improved accuracy is obtained due to the following factors:
  The pressure increase inside the cavity (due to reduction of the cavity volume) can be monitored and correlated to the capacitance read-out out of the membrane.
  Signal drift e.g. due to pressure build-up which can be detected in the reference gauge can easily be corrected for.
  Internal pressure increase due to thermal expansion can be corrected for.
  Deflection of the capacitive membrane due to thermal expansion of the cavity can be compensated for.
  A non-linear capacitance response is obtained as function of membrane deflection or applied pressure. The internal pressure increase due to volume reduction follows a rather linear relation. If these inputs are combined an improved signal can be achieved, with improved resolution due o improved signal to noise ratio.

In the pressure sensor of the invention, the pressure increase inside the cavity due to reduction of the cavity volume as a result of the membrane deflection can be monitored and correlated to the capacitance read-out out of the membrane. Signal drift e.g. due to pressure build-up in the reference sensor can easily be corrected for. This allows application of a multitude of membrane and sealing type approaches (CVD, PECVD, PVD). An internal pressure increase due to thermal expansion of the gas can also be corrected for.

For example, thermal expansion of the gas can be decoupled from the other readings using an on-chip temperature meter. For the implementation with a Pirani gauge, the thermometer can also be a non-suspended duplicate of the Pirani gauge.

The invention is of particular interest as a pressure sensor in consumer applications like mobile phones (built next to the microphone), weather stations, GPS assist, watches, etc. Other applications include a pressure sensor in automotive applications like Tire Pressure Monitoring Systems (TPMS), in smart building applications (HVAC, air flow measurements, pressure drop over air filters) and medical applications (catheters, implants, blood pressure).

FIG. 16 shows the design of FIG. 12K with a pressure applied and for the Pirani gauge version.

As shown, the output of the capacitive pressure sensor 180 comprises a capacitance C and the output of the Pirani sensor 182 is a measurement voltage Vmeas in response to an applied heating current Iheat.

Various other modifications will be apparent to those skilled in the art.

The invention claimed is:

1. A pressure sensor, comprising:
a first pressure sensor element having an output and comprising a capacitive Micro Electro Mechanical Systems (MEMS) pressure sensor having a deformable top electrode, and a fixed bottom electrode spaced by a first cavity portion, wherein the top electrode deforms in response to a pressure difference between an external pressure and an internal cavity pressure; and
a second pressure sensor element having an output and housed within a second cavity portion,
wherein:
the second cavity portion has a rigid top cover,
the first and second cavity portions are connected to define a combined sealed cavity,
the second pressure sensor element is configured and arranged with the first pressure sensor element output, such that the second pressure sensor element output provides calibration of the first pressure sensor output,
the second pressure sensor element measures the internal cavity pressure,
a detection routine uses a capacitance input of the first pressure sensor element with data on the internal cavity pressure provided by the second pressure sensor element,
the first and second cavity portions are side-by-side over a Complementary Metal-Oxide Semiconductor (CMOS) integrated circuit,
the top electrode comprises tungsten and a silicon nitride capping layer is applied on the top electrode,
the bottom electrode is made of a metal and an isolation layer is provided over the bottom electrode such that the isolation layer is between the bottom electrode and the first cavity.

2. A sensor as claimed in claim 1, wherein:
the first and second cavity portions are side by side over a Silicon on Insulator (SOI) substrate arrangement comprising a wafer, an insulator layer over the wafer and a semiconductor layer over the insulator, and
the cavity portions are connected by a channel formed in the insulator layer.

3. A sensor as claimed in claim 2, wherein each cavity portion connects to, and extends, the channel through a respective via formed in the semiconductor layer.

4. A sensor as claimed in claim 2, wherein the first cavity portion is over the semiconductor layer, and the second cavity portion is formed in the semiconductor layer.

5. A sensor as claimed in claim 1, wherein a top metal layer of the CMOS integrated circuit is used for forming electrical connections between at least one external pressure sensor contact and at least one internal pressure sensor electrode.

6. A sensor as claimed in claim 1, wherein the second pressure sensor element comprises a Pirani gauge.

7. A sensor as claimed in claim 1, wherein the second pressure sensor element comprises a MEMS resonator, having resonance frequency used to determine the pressure.

8. A sensor as claimed in claim 7, wherein a quality factor of the resonance frequency is used to determine the pressure.

9. A method of operating a pressure sensor, comprising:
measuring an external pressure using a first pressure sensor element having a capacitive MEMS pressure sensor having a deformable top electrode, and a fixed bottom electrode spaced by a first cavity portion, wherein the top electrode deforms in response to a pressure difference between the external pressure and an internal cavity pressure;
measuring the internal cavity pressure using a second pressure sensor element housed within a second cavity portion, wherein the first and second cavity portions are connected to define a combined sealed cavity; and
combining the external and internal pressure measurements, such that the second pressure sensor element output provides calibration of the first pressure sensor output,
wherein:
the second cavity portion has a rigid top cover,
a detection routine uses a capacitance input of the first pressure sensor element with data on the internal cavity pressure provided by the second pressure sensor element,
the first and second cavity portions are side-by-side over a Complementary Metal-Oxide Semiconductor (CMOS) integrated circuit,
the top electrode comprises tungsten and a silicon nitride capping layer is applied on the top electrode,
the bottom electrode is made of a metal and an isolation layer is provided over the bottom electrode such that the isolation layer is between the bottom electrode and the first cavity.

10. A method as claimed in claim 9, comprising combining the internal and external pressure measurements with stored calibration parameters in the form of Capacitance-Pressure (C-P) data points or Capacitance-Voltage data points.

11. A method as claimed in claim 9, wherein:
the second pressure sensor element comprises a Pirani gauge, or
the second pressure sensor element comprises a MEMS resonator, and the method further comprises determining a resonance frequency of the MEMS resonator and using this to estimate the internal pressure, or
the second pressure sensor element comprises a MEMS resonator, and the method comprises determining a quality factor of the resonance and using this to estimate the internal pressure.

12. A method of manufacturing a pressure sensor, comprising:
forming a first pressure sensor element comprising a capacitive MEMS pressure sensor having a deformable top electrode, and a fixed bottom electrode spaced by a first cavity portion;
forming a second pressure sensor element housed within a second cavity portion, and forming a rigid top cover over the second cavity portion; and
connecting the first and second cavity portions to define a combined sealed cavity,
wherein:
the combined sealed cavity is formed via a sacrificial etch, by deposition of a sacrificial layer and subsequent removal of the sacrificial layer,
the first and second cavity portions are side-by-side over a Complementary Metal-Oxide Semiconductor (CMOS) integrated circuit,
the top electrode comprises tungsten and a silicon nitride capping layer is applied on the top electrode,
the bottom electrode is made of a metal and an isolation layer is provided over the bottom electrode, such that the isolation layer is between the bottom electrode and the first cavity,
the sacrificial layer is silicon oxide, and a second pressure sensor element output provides calibration of a first pressure sensor output.

13. A method as claimed in claim 12, comprising providing a SOI substrate arrangement comprising a wafer, an insulator layer over the wafer and a semiconductor layer over the insulator, wherein:
the first cavity portion is formed over the semiconductor layer,
the second cavity portion is formed in the semiconductor layer, and
the first and second cavity portions are connected by a channel formed in the insulator layer to define the combined sealed cavity.

14. A method as claimed in claim 12, comprising providing a CMOS circuit comprising a wafer with a multilevel interconnect arrangement, wherein:
the first cavity portion is over the multilevel interconnect arrangement, and
the interconnect arrangement is used to form electrical connections to the pressure sensor elements.

15. A method as claimed in claim 12, wherein forming the second pressure sensor element comprises forming a Pirani gauge or a MEMS resonator having a resonance frequency dependent on pressure.

16. A pressure sensor, comprising:
a first pressure sensor element having an output and comprising a capacitive Micro Electro Mechanical Systems (MEMS) pressure sensor having a deformable top electrode, and a fixed bottom electrode spaced by a first cavity portion, wherein the top electrode deforms in response to a pressure difference between an external pressure and an internal cavity pressure; and
a second pressure sensor element having an output and housed within a second cavity portion,
wherein:
the second cavity portion has a rigid top cover, wherein the first and second cavity portions are connected to define a combined sealed cavity,
the second pressure sensor element is configured and arranged with the first pressure sensor element output, such that the second pressure sensor element output provides calibration of the first pressure sensor output,
the second pressure sensor element measures the internal cavity pressure,
a detection routine uses a capacitance input of the first pressure sensor element with data on the internal cavity pressure provided by the second pressure sensor element,
the first and second cavity portions are side-by-side over a Complementary Metal-Oxide Semiconductor (CMOS) integrated circuit,
the top electrode comprises tungsten and is positioned on a silicon nitride membrane,
a silicon nitride passivation layer is applied on the top electrode such that the top electrode is between the silicon nitride membrane and the silicon nitride passivation layer, and
the bottom electrode is made of a metal and an isolation layer is provided over the bottom electrode such that the isolation layer is between the bottom electrode and the first cavity.

17. A pressure sensor, comprising:
a first pressure sensor element having an output and comprising a capacitive Micro Electro Mechanical Systems (MEMS) pressure sensor having a deformable top electrode, and a fixed bottom electrode spaced by a first cavity portion, wherein the top electrode deforms in response to a pressure difference between an external pressure and an internal cavity pressure; and
a second pressure sensor element having an output and housed within a second cavity portion,
wherein:
the second cavity portion has a rigid top cover,
the first and second cavity portions are connected to define a combined sealed cavity,
the second pressure sensor element is configured and arranged with the first pressure sensor element output, such that the second pressure sensor element output provides calibration of the first pressure sensor output,
the second pressure sensor element measures the internal cavity pressure,
a detection routine uses a capacitance input of the first pressure sensor element with data on the internal cavity pressure provided by the second pressure sensor element,
the first and second cavity portions are side-by-side over a Complementary Metal-Oxide Semiconductor (CMOS) integrated circuit,
the top electrode comprises tungsten and a silicon nitride capping layer is applied to the top electrode,
the bottom electrode is made of a metal and an isolation layer is provided over the bottom electrode such that the isolation layer is between the bottom electrode and the first cavity,
the second pressure sensor element comprises a Pirani gauge, and
the Pirani gauge is realized as a surface micromachined silicon Pirani device that is arranged as a wire with gaps between the wire and side heat sinks.

* * * * *